(12) United States Patent
Quignard et al.

(10) Patent No.: US 12,371,627 B2
(45) Date of Patent: Jul. 29, 2025

(54) INTEGRATED METHOD FOR PROCESSING PYROLYSIS OILS OF PLASTICS AND/OR SOLID RECOVERED FUELS LOADED WITH IMPURITIES

(71) Applicant: IFP ENERGIES NOUVELLES, Rueil-Malmaison (FR)

(72) Inventors: Alain Quignard, Rueil-Malmaison (FR); Wilfried Weiss, Rueil-Malmaison (FR); Duc Nguyen-Hong, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 6 days.

(21) Appl. No.: 18/559,037

(22) PCT Filed: Apr. 28, 2022

(86) PCT No.: PCT/EP2022/061286
§ 371 (c)(1),
(2) Date: Nov. 3, 2023

(87) PCT Pub. No.: WO2022/233687
PCT Pub. Date: Nov. 10, 2022

(65) Prior Publication Data
US 2024/0240091 A1   Jul. 18, 2024

(30) Foreign Application Priority Data

May 7, 2021   (FR) ...................................... 2104873

(51) Int. Cl.
*C10G 65/12*   (2006.01)
*B01D 3/14*   (2006.01)
(Continued)

(52) U.S. Cl.
CPC ............. *C10G 65/12* (2013.01); *B01D 3/143* (2013.01); *B01D 3/38* (2013.01); *B01D 11/0492* (2013.01);
(Continued)

(58) Field of Classification Search
None
See application file for complete search history.

(56) References Cited

U.S. PATENT DOCUMENTS

| 4,498,972 A | 2/1985 | Toulhoat et al. |
| 4,510,042 A | 4/1985 | Billon et al. |
| (Continued) | | |

FOREIGN PATENT DOCUMENTS

WO   2014001632 A1   1/2014

OTHER PUBLICATIONS

International Search Report PCT/EP2022/061286 dated Jun. 17, 2022 (pp. 1-5).

*Primary Examiner* — Bobby Ramdhanie
*Assistant Examiner* — Alyssa L Cepluch

(57) ABSTRACT

The invention relates to a process for treating a plastics and/or solid recovery fuel pyrolysis oil, comprising:
a) optionally, selective hydrogenation of the feedstock;
b) hydroconversion in an ebullated bed, in an entrained bed and/or in a moving bed, to obtain a hydroconverted effluent;
c) hydrotreatment of said hydroconverted effluent from step b) to obtain a hydrotreated effluent, without any intermediate separation step between steps b) and c),
c') optionally, hydrocracking of said effluent from step c),
c) separation of the effluent from step c) or c') in the presence of an aqueous stream, to obtain a gaseous effluent, an aqueous liquid effluent and a liquid hydrocarbon effluent;
d) optionally a fractionation to obtain at least one gas stream and one cut with a boiling point of less than or equal to 175° C. and one cut with a boiling point of greater than 175° C.

15 Claims, 1 Drawing Sheet

(51) Int. Cl.
  *B01D 3/38* (2006.01)
  *B01D 11/04* (2006.01)
  *C10G 1/00* (2006.01)
  *C10G 1/10* (2006.01)

(52) U.S. Cl.
  CPC .............. *C10G 1/002* (2013.01); *C10G 1/10* (2013.01); *C10G 2300/1003* (2013.01); *C10G 2300/1007* (2013.01)

(56) References Cited

U.S. PATENT DOCUMENTS

| | | |
|---|---|---|
| 4,818,743 A | 4/1989 | Simpson et al. |
| 5,068,484 A * | 11/1991 | James, Jr. .............. C10G 65/06 585/641 |
| 5,089,463 A | 2/1992 | Johnson |
| 5,221,656 A | 6/1993 | Clark et al. |
| 5,622,616 A | 4/1997 | Porter et al. |
| 5,827,421 A | 10/1998 | Sherwood, Jr. |
| 6,332,976 B1 | 12/2001 | Mignard et al. |
| 6,589,908 B1 | 7/2003 | Ginestra et al. |
| 7,119,045 B2 | 10/2006 | Magna et al. |
| 9,062,258 B2 | 6/2015 | Mayeur et al. |
| 9,109,168 B2 | 8/2015 | Dupassieux et al. |
| 10,843,158 B2 | 11/2020 | Plais et al. |
| 2007/0080099 A1 | 4/2007 | Reid et al. |
| 2015/0001061 A1* | 1/2015 | Bordynuik ................ C10L 1/06 202/112 |
| 2016/0312130 A1* | 10/2016 | Merdrignac ......... C10G 67/049 |
| 2016/0362609 A1 | 12/2016 | Ward et al. |
| 2019/0161683 A1 | 5/2019 | Narayanaswamy et al. |
| 2021/0189248 A1* | 6/2021 | Timken .................. C10G 1/002 |

* cited by examiner

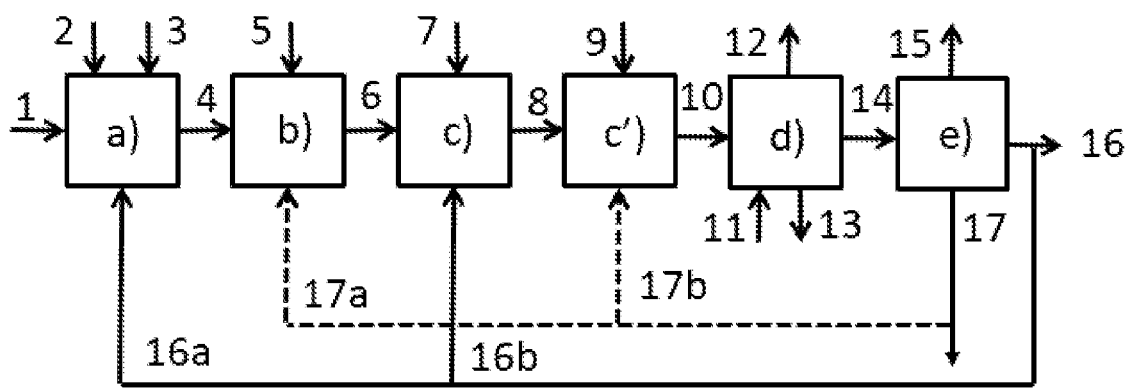

INTEGRATED METHOD FOR PROCESSING PYROLYSIS OILS OF PLASTICS AND/OR SOLID RECOVERED FUELS LOADED WITH IMPURITIES

TECHNICAL FIELD

The present invention relates to an integrated process for treating a plastics and/or solid recovery fuel (SRF), pyrolysis oil loaded with impurities, so as to obtain a hydrocarbon effluent which can be upgraded by being at least partly incorporated directly into a naphtha or diesel pool or as feedstock for a steam cracking unit. More particularly, the present invention relates to a process for treating a feedstock obtained from the pyrolysis of plastic waste and/or of SRF, so as to remove at least some of the impurities that said feedstock may contain in large amounts, and so as to hydrogenate the feedstock in order to be able to upgrade it.

PRIOR ART

The plastics resulting from collection and sorting channels can undergo a step of pyrolysis in order to obtain, inter alia, pyrolysis oils. These plastics pyrolysis oils are generally incinerated in order to generate electricity and/or used as fuel in industrial or urban heating boilers.

Solid recovery fuels (SRFs), also called "refuse-derived fuel" or RDF, are solid non-hazardous waste prepared for energy recovery, whether they come from household and similar waste, waste from economic activities or construction and demolition waste. SRFs are generally a mixture of any combustible waste such as used tyres, food by-products (fats, animal meal, etc.), viscose and wood waste, light fractions from shredders (for example from used vehicles, electrical and electronic equipment (WEEE), household and commercial waste, residues from the recycling of various types of waste, including certain municipal waste, plastic waste, textiles, and wood among others. SRFs generally contain plastic waste. Nowadays, SRFs are mainly recovered as energy. They can be used directly as substitutes for fossil fuels in co-incineration facilities (coal and lignite power stations, cement works, lime kilns) or in household waste incineration units, or indirectly in pyrolysis units dedicated to energy recovery: SRF pyrolysis oils are thus generally burned to generate electricity, or even are used as fuel in industrial or urban heating boilers.

Another route for upgrading plastics and/or SRF pyrolysis oils is the use of these pyrolysis oils as feedstock for a steam cracking unit so as to (re)create olefins, said olefins being constituent monomers of certain polymers. However, plastic waste or SRFs are generally mixtures of several polymers, for example mixtures of polyethylene, polypropylene, polyethylene terephthalate, polyvinyl chloride and polystyrene. In addition, depending on the uses, plastics may contain, in addition to polymers, other compounds, such as plasticizers, pigments, dyes or polymerization catalyst residues, and also other very varied organic and mineral impurities from sorting center separation operations, the selectivity of which operation may not be total. Thus, the oils obtained from the pyrolysis of plastics or of SRF comprise a lot of impurities, in particular diolefins, metals, silicon, or halogenated compounds, notably chlorine-based compounds, heteroelements such as sulfur, oxygen and nitrogen, and insoluble matter, in contents that are often high and incompatible with steam cracking units or units located downstream of the steam cracking units, notably polymerization processes and selective hydrogenation processes. These impurities can give rise to operability problems and in particular problems of corrosion, of coking or of catalytic deactivation, or also incompatibility problems in the uses of the target polymers. The presence of diolefins very often leads to problems of instability of the pyrolysis oil, characterized by the formation of gums. The gums and the insoluble materials which may be present in the pyrolysis oil can give rise to problems of clogging in the processes.

Furthermore, during the steam cracking step, the yields of light olefins sought for petrochemistry, notably ethylene and propylene, depend greatly on the quality of the feedstocks sent for steam cracking. The BMCI (Bureau of Mines Correlation Index) is often used to characterize hydrocarbon cuts. This index, developed for hydrocarbon products resulting from crude oils, is calculated from the measurement of the density and the average boiling point: it is equal to 0 for a linear paraffin and to 100 for benzene. Its value thus increases in proportion as the product analyzed has a condensed aromatic structure, naphthenes having an intermediate BMCI between paraffins and aromatics. Overall, the yields of light olefins increase when the paraffin content increases and thus when the BMCI decreases. Conversely, the yields of undesired heavy compounds and/or of coke increase when the BMCI increases. Document WO 2018/055555 proposes an overall process for the recycling of plastic waste which is very general and relatively complex, ranging from the very step of pyrolysis of the plastic waste up to the steam cracking step. The process comprises, inter alia, a step of hydrotreating the liquid phase resulting directly from the pyrolysis, preferably under quite stringent conditions, in particular in terms of temperature, for example at a temperature of between 260 and 300° C., a step of separation of the hydrotreatment effluent and then a step of hydrodealkylation of the separated heavy effluent at a preferably high temperature, for example of between 260 and 400° C.

The unpublished patent application FR 20/01758 describes a process for treating a plastics pyrolysis oil, comprising:
- a) selective hydrogenation of said feedstock in the presence of hydrogen and of a selective hydrogenation catalyst to obtain a hydrogenated effluent;
- b) fixed-bed hydrotreatment of said hydrogenated effluent in the presence of hydrogen and of a hydrotreatment catalyst, to obtain a hydrotreatment effluent;
- c) separation of the hydrotreatment effluent in the presence of an aqueous stream, at a temperature of between 50 and 370° C., to obtain a gaseous effluent, an aqueous liquid effluent and a liquid hydrocarbon effluent;
- d) optionally, a step of fractionation of all or part of the hydrocarbon effluent obtained from step c), to obtain a gas stream and at least two hydrocarbon streams which may be a naphtha cut and a heavier cut;
- e) a recycling step comprising a phase of recovering a fraction of the hydrocarbon effluent obtained from separation step c) or a fraction of and/or at least one of the hydrocarbon streams obtained from fractionation step d), to selective hydrogenation step a) and/or hydrotreatment step b).

According to patent application FR 20/01758, the naphtha cut obtained from the fractionation step may be totally or partly sent either to a steam cracking unit or to a naphtha pool obtained from conventional petroleum-based feedstocks, or may be recycled to step e).

The heavier cut obtained from the fractionation step may be totally or partly sent either to a steam cracking unit or to a diesel or kerosene pool obtained from conventional petroleum-based feedstocks, or may be recycled into step e).

Unpublished patent applications FR 20/08108 and FR20/08106 are based on the process of FR20/01758 and describe a process for treating a plastics pyrolysis oil, incorporating one or two steps of hydrocracking in a fixed bed after the hydrotreatment step. These processes make it possible to minimize the yield of the heavy cut and to maximize the yield of the naphtha cut by transforming the heavy cut at least partly into naphtha cut by hydrocracking, which is the cut that is generally favored for a steam cracking unit. Although the heavier cut can be sent to a steam cracking unit, few refiners favor this option. The reason for this is that the heavier cut has a high BMCI and contains, relative to the naphtha cut, more naphthenic, naphtheno-aromatic and aromatic compounds, thus leading to a higher C/H ratio. This high ratio is a cause of coking in the steam cracker, thus requiring steam cracking furnaces dedicated to this cut. Furthermore, the steam cracking of such a heavy cut produces a smaller amount of products of interest which are notably ethylene and propylene, but more pyrolysis gasoline.

Due to the content of impurities in pyrolysis oils, notably when they are heavily loaded with impurities, deactivation of the catalysts of the hydrotreatment unit which is operated in a fixed bed may be observed, which reduces the cycle time. Indeed, the main constraint of fixed-bed units is the fact that the unit has to be shut down to replace the catalysts. In addition, pyrolysis oils, notably those heavily loaded with impurities, can create clogging problems notably in preheating furnaces, feedstock/effluent exchangers or on the bed heads of catalytic reactors.

It would thus be advantageous to propose a process for treating pyrolysis oils having long-lasting catalytic cycles by allowing replacement of the catalysts without shutting down the unit, while at the same time producing a cut rich in alkanes which can be readily upgraded in a steam cracking unit.

Hydroconversion units operated with an ebullated bed, an entrained bed or even a moving bed are capable of processing this type of feedstock by virtue of a system for adding fresh catalyst and withdrawing spent catalyst without shutting down the unit. The addition of fresh catalyst and the withdrawal of spent catalyst are generally performed continuously, semi-continuously or periodically. These systems, which compensate for the deactivation of the catalysts due to impurities in the pyrolysates and solve the problems of clogging of the beds of catalysts of reactors operated with a fixed bed, allow the hydroconversion units to have a long cycle time without the need to shut down to replace the catalysts.

Furthermore, when such a hydroconversion unit is placed upstream of a hydrotreatment unit, the cycle time of the latter is increased by virtue of the hydrotreatment reactions performed partly beforehand in the hydroconversion unit.

Similarly, the hydrocracking reactions performed in the hydroconversion unit make it possible to transform at least some of the heavy compounds into lighter compounds, which makes it possible firstly to feed the hydrotreatment unit with a cut that is generally easier to process and secondly to obtain a cut having a lower BMCI which is thus particularly suitable for a steam cracking unit.

Unpublished patent application FR 20/09.750 describes such a process for treating a plastics and/or SRF pyrolysis oil comprising notably:

a) optionally a step of selective hydrogenation of said feedstock in the presence of hydrogen and a selective hydrogenation catalyst to obtain a hydrogenated effluent;

b) a step of hydroconversion using at least one ebullated-bed reactor, entrained-bed reactor and/or moving-bed reactor, comprising at least one hydroconversion catalyst, said hydroconversion reaction section being fed at least with said feedstock or with said hydrogenated effluent obtained from step a) and a gas stream comprising hydrogen, to obtain a hydroconverted effluent;

c) a separation step, fed with the hydroconverted effluent obtained from step b) and an aqueous solution, said step being performed at a temperature of between 50 and 450° C., to obtain at least one gaseous effluent, an aqueous effluent and a hydrocarbon effluent;

d) a step of fractionating all or some of the hydrocarbon effluent obtained from step c), to obtain at least one gas stream, a hydrocarbon cut comprising compounds with a boiling point of less than or equal to 385° C. and a hydrocarbon cut comprising compounds with a boiling point above 385° C., e) a hydrotreatment step using at least one fixed-bed reactor comprising at least one hydrotreatment catalyst, said hydrotreatment reaction section being supplied with at least one portion of said hydrocarbon cut comprising compounds having a boiling point less than or equal to 385° C. from step d) and a gas stream comprising hydrogen, to obtain a hydrotreated effluent;

f) a separation step, fed with the hydrotreated effluent obtained from step e) to obtain at least a gaseous effluent and a hydrotreated liquid hydrocarbon effluent.

Research work has led the applicant to discover that, surprisingly, an improvement of existing processes is possible by a combination of different steps, linked together in a specific way.

SUMMARY OF THE INVENTION

The invention relates to a process for treating a feedstock comprising a plastics and/or solid recovery fuel pyrolysis oil, comprising:

a) optionally, a selective hydrogenation step performed in a reaction section fed at least with said feedstock and a gas stream comprising hydrogen, in the presence of at least one selective hydrogenation catalyst, at a temperature of between 100 and 280° C., a partial pressure of hydrogen of between 1.0 and 20.0 MPa abs. and an hourly space velocity of between 0.3 and 10.0 $h^{-1}$, to obtain a hydrogenated effluent;

b) a hydroconversion step performed in a hydroconversion reaction section, using at least one ebullated-bed reactor, entrained-bed reactor and/or moving-bed reactor, comprising at least one hydroconversion catalyst, said hydroconversion reaction section being fed at least with said feedstock or with said hydrogenated effluent obtained from step a) and a gas stream comprising hydrogen, said hydroconversion reaction section being operated at a temperature of between 250 and 450° C., a partial pressure of hydrogen of between 1.0 and 20.0 MPa abs. and an hourly space velocity of between 0.05 and 10.0 $h^{-1}$, to obtain a hydroconverted effluent;

c) a hydrotreatment step implemented in a hydrotreatment reaction section, implementing at least one fixed-bed reactor having n catalytic beds, n being an integer greater than or equal to 1, each comprising at least one hydrotreatment catalyst, said hydrotreatment reaction section being supplied with at least a portion of said hydroconverted effluent from step b) and a gas stream comprising hydrogen, said hydrotreatment reaction section being implemented at a temperature of between 250 and 430° C., a hydrogen partial pressure between 1.0 and 20.0 MPa abs. and an hourly volume velocity between 0.1 and 10.0 $h^{-1}$, to obtain a hydrotreated effluent; said hydrotreatment step c) being carried out after hydroconversion step b) without an intermediate separation step between hydroconversion step b) and hydrotreatment step c), c') optionally, a hydrocracking step performed in a hydrocracking reaction section, using at least one fixed bed containing n catalytic beds, n being an integer greater than or equal to 1, each comprising at least one hydrocracking catalyst, said hydrocracking reaction section being fed at least with said hydrotreated effluent obtained from step c) and/or with the cut comprising compounds with a boiling point greater than 175° C. obtained from step e) and a gas stream comprising hydrogen, said hydrocracking reaction section being used at an average temperature of between 250 and 450° C., a partial pressure of hydrogen of between 1.5 and 20.0 MPa abs. and an hourly space velocity of between 0.1 and 10.0 $h^{-1}$, to obtain a hydrocracked effluent which is sent to separation step d), d) a separation step, fed with the hydrotreated effluent obtained from step c) or with the hydrocracked effluent obtained from step c') and an aqueous solution, said step being performed at a temperature of between 50 and 450° C., to obtain at least one gaseous effluent, an aqueous effluent and a hydrocarbon effluent, e) optionally a step of fractionating all or a part of the hydrocarbon effluent obtained from step d), to obtain at least one gaseous effluent and at least one cut comprising compounds with a boiling point of less than or equal to 175° C. and one hydrocarbon cut comprising compounds with a boiling point of greater than 175° C.

In the text hereinbelow, the term "pyrolysis oil" means an oil obtained from the pyrolysis of plastics and/or SRFs, unless otherwise indicated.

One advantage of the process according to the invention is that of purifying a pyrolysis oil of at least some of its impurities, which makes it possible to hydrogenate it and thus to be able to upgrade it in particular by incorporating it directly into a fuel pool and/or by making it compatible with a treatment in a steam cracking unit so as to be able in particular to obtain light olefins which may serve as monomers in the manufacture of polymers.

Another advantage of the invention is that of preventing risks of clogging and/or corrosion of the treatment unit in which the process of the invention is performed, the risks being exacerbated by the presence, often in large amounts, of diolefins, metals and halogenated compounds in the pyrolysis oil.

The process of the invention thus makes it possible to obtain a hydrocarbon effluent obtained from a pyrolysis oil which is at least partly freed of the impurities of the starting pyrolysis oil, thus limiting the problems of operability, such as the corrosion, coking or catalytic deactivation problems, to which these impurities may give rise, in particular in steam cracking units and/or in units located downstream of the steam cracking units, notably the polymerization and selective hydrogenation units. The removal of at least some of the impurities from the pyrolysis oils will also make it possible to increase the range of applications of the target polymers, the application incompatibilities being reduced.

Performing a hydroconversion step using a system for adding fresh catalyst and withdrawing used catalyst without shutting down the unit upstream of a fixed-bed hydrotreatment step makes it possible in particular to treat pyrolysis oils that are heavily loaded with impurities.

Performing a hydroconversion step using a system for adding fresh catalyst and withdrawing used catalyst without shutting down the unit upstream of a fixed-bed hydrotreatment step makes it possible not only to obtain long cycle times for hydroconversion but also makes it possible to lengthen the cycle time for the hydrotreatment step. In addition, the risk of clogging of the catalytic bed(s) of the hydrotreatment step is reduced.

Performing a hydroconversion step using a system for adding fresh catalyst and withdrawing used catalyst without shutting down the unit upstream of a fixed-bed hydrotreatment step also makes it possible to convert at least some of the heavy compounds into lighter compounds, which makes it possible to obtain improved yields of the cut suitable for the steam cracking unit and, when this cut is sent for steam cracking, improved yields of light olefins, while at the same time reducing in particular the formation of coke in large amounts and/or the risks of corrosion encountered during subsequent step(s), for example during the step of steam cracking of the pyrolysis oils.

Furthermore, the process according to the invention is characterized in that it does not comprise an intermediate separation step between hydroconversion step b) and hydrotreatment step c). Sending the effluent from hydroconversion step b) directly to hydrotreatment step c) without a separation step has several advantages, notably:

the process has better thermal integration since the temperature of the effluent at the outlet of hydroconversion step b) is maintained. This does not exclude the fact that the temperature of the effluent from hydroconversion step b) can be controlled and adjusted before hydrotreatment step c);

the process has better energy efficiency since there is no significant pressure drop between the outlet of hydroconversion section b) and the inlet of hydrotreatment section c);

the device making it possible to implement the process, and more particularly the elements necessary for the recycling of hydrogen in the process, can be simplified. Indeed, in the absence of intermediate separation, a single hydrogen recirculation loop common to the hydroconversion section and to the hydrotreatment section is necessary since there is no evacuation of a gas rich in hydrogen at the end of the hydroconversion step. A single compressor is therefore sufficient, and the size of this compressor can be reduced insofar as the flow rate of recycled gas is also lower.

According to one variant, the process according to the invention comprises fractionation step e).

According to one variant, the process according to the invention comprises hydrocracking step c').

According to one variant, the process according to the invention comprises said selective hydrogenation step a).

According to one variant, at least one fraction of the hydrocarbon effluent obtained from separation step d) or at least one fraction of the naphtha cut comprising compounds with a boiling point of less than or equal to 175° C. obtained from fractionation step e) is sent to selective hydrogenation step a) and/or hydrotreatment step c).

According to one variant, at least one fraction of the cut comprising compounds with a boiling point greater than 175° C. resulting from fractionation step e) is sent to hydroconversion step b) and/or hydrocracking step c').

According to one variant, the process according to the invention comprises a step a0) of pretreating the feedstock, said pretreatment step being carried out upstream of hydrogenation step a) and comprising a filtration step and/or an electrostatic separation step and/or a step of washing by means of an aqueous solution and/or an adsorption step.

According to one variant, the hydrocarbon effluent obtained from separation step d), or at least one of the two liquid hydrocarbon streams obtained from step e), is totally or partly sent to a steam cracking step f) carried out in at least one pyrolysis furnace at a temperature of between 700 and 900° C. and at a pressure of between 0.05 and 0.3 MPa relative.

According to one variant, separation step e) also comprises fractionation of the naphtha cut comprising compounds with a boiling point of less than or equal to 175° C. into a light naphtha cut comprising compounds with a boiling point below 80° C. and a heavy naphtha cut comprising compounds with a boiling point of between 80 and 175° C.

According to one variant, at least part of said heavy naphtha cut is sent to an aromatic complex including at least one naphtha reforming step and/or wherein at least part of the light naphtha cut is sent to steam cracking step f).

According to one variant, said selective hydrogenation catalyst comprises a support chosen from alumina, silica, silicas-aluminas, magnesia, clays and mixtures thereof and a hydro-dehydrogenating function comprising either at least one element from group VIII and at least one element from group VIB, or at least one element from group VIII.

According to one variant, when step b) is performed in an ebullated bed or in a moving bed, said hydroconversion catalyst of step b) comprises a supported catalyst comprising a group VIII metal chosen from the group formed by Ni, Pd, Pt, Co, Rh and/or Ru, optionally a group VIB metal chosen from the group of Mo and/or W, on an amorphous mineral support chosen from the group formed by alumina, silica, silica-aluminas, magnesia, clays and mixtures of at least two of these minerals, and when step b) is performed in an entrained bed, said hydroconversion catalyst of step b) comprises a dispersed catalyst containing at least one element chosen from the group formed by Mo, Fe, Ni, W, Co, V and Ru.

According to a variant, said hydrotreatment catalyst comprises a support chosen from the group consisting of alumina, silica, silicas-aluminas, magnesia, clays and mixtures thereof and a hydro-dehydrogenating function comprising at least one element from group VIII and/or at least one element from group VIB.

According to one variant, the process according to the invention also comprises a second hydrocracking step c") performed in a hydrocracking reaction section, using at least one fixed bed containing n catalytic beds, n being an integer greater than or equal to 1, each comprising at least one hydrocracking catalyst, said hydrocracking reaction section being fed with the cut comprising compounds with a boiling point greater than 175° C. obtained from step e) and a gas stream comprising hydrogen, said hydrocracking reaction section being used at a temperature of between 250 and 450° C., a partial pressure of hydrogen of between 1.5 and 20.0 MPa abs. and an hourly space velocity of between 0.1 and 10.0 h$^{-1}$, to obtain a hydrocracked effluent which is sent to separation step d).

According to a variant, said hydrocracking catalyst comprises a support chosen from halogenated aluminas, combinations of boron and aluminum oxides, amorphous silica-aluminas and zeolites and a hydro-dehydrogenating function comprising at least one metal from group VIB chosen from chromium, molybdenum and tungsten, alone or as a mixture, and/or at least one metal from group VIII chosen from iron, cobalt, nickel, ruthenium, rhodium, palladium and platinum.

According to one variant, the feedstock has the following properties:
 a content of aromatic compounds of between 0 and 90% by weight,
 a content of halogenated compounds of between 2 and 5000 ppm by weight,
 a content of metallic elements of between 10 and 10 000 ppm by weight,
 including a content of iron element of between 0 and 100 ppm by weight,
 a content of silicon element of between 0 and 1000 ppm by weight.

The invention also relates to the product which may be obtained via the treatment process according to the invention.

According to one variant, the product includes, relative to the total weight of the product:
 a total content of metal elements of less than or equal to 5.0 ppm by weight,
 including a content of iron element of less than or equal to 100 ppb by weight,
 a content of silicon element of less than or equal to 1.0 ppm by weight,
 a sulfur content of less than or equal to 500 ppm by weight,
 a nitrogen content of less than or equal to 100 ppm by weight,
 a content of chlorine element of less than or equal to 10 ppm by weight.

According to the present invention, the pressures are absolute pressures, also denoted abs., and are given in MPa absolute (or MPa abs.), unless otherwise indicated.

According to the present invention, the expressions "of between . . . and . . . " and "between . . . and . . . " are equivalent and mean that the limiting values of the interval are included in the described range of values. If such were not the case and if the limiting values were not included in the range described, such a clarification will be introduced by the present invention.

For the purposes of the present invention, the various ranges of parameters for a given step, such as the pressure ranges and the temperature ranges, can be used alone or in combination. For example, within the meaning of the present invention, a range of preferred pressure values can be combined with a range of more preferred temperature values.

In the text hereinbelow, specific and/or preferred embodiments of the invention may be described. They can be implemented separately or combined together, without limitation of combination when this is technically feasible.

Subsequently, the groups of chemical elements are given according to the CAS classification (CRC Handbook of Chemistry and Physics, published by CRC Press, editor-in-chief D.R. Lide, 81$^{st}$ edition, 2000-2001). For example, group VIII according to the CAS classification corresponds to the metals of columns 8, 9 and 10 according to the new IUPAC classification. The content of metals is measured by X-ray fluorescence.

DETAILED DESCRIPTION

The Feedstock

According to the invention, a "plastics pyrolysis oil or SRF pyrolysis oil" is an oil, advantageously in liquid form at ambient temperature, obtained from the pyrolysis of plastics, preferably of plastic waste notably originating from collection and sorting channels, or originating from the pyrolysis of SRFs. It comprises in particular a mixture of hydrocarbon compounds, notably paraffins, olefins, naphthenes and aromatics. At least 80% by weight of these hydrocarbon compounds preferably have a boiling point of less than 700° C., and preferably of less than 550° C. In particular, according to the origin of the pyrolysis oil, the latter can comprise up to 70% by weight of paraffins, up to 90% by weight of olefins and up to 90% by weight of aromatics, it being understood that the sum of the paraffins, of the olefins and of the aromatics is 100% by weight of the hydrocarbon compounds.

The density of the pyrolysis oil, measured at 15° C. according to the ASTM D4052 method, is generally of between 0.75 and 0.99 $g/cm^3$, preferably of between 0.75 and 0.95 $g/cm^3$.

The pyrolysis oil may also comprise, and usually does comprise, impurities, such as metals, notably iron, silicon or halogenated compounds, notably chlorinated compounds. These impurities may be present in the pyrolysis oil in high contents, for example up to 500 ppm by weight or even 1000 ppm by weight or even 5000 ppm by weight of halogen elements provided by halogenated compounds, up to 2500 ppm by weight, or even 10 000 ppm by weight of metallic or semi-metallic elements. Alkali metals, alkaline earth metals, transition metals, post-transition metals and metalloids can be put into the same category as contaminants of metal nature, referred to as metals or metal or semi-metal elements. The pyrolysis oil may comprise up to 200 ppm by weight or even 1000 ppm by weight of silicon, and up to 15 ppm by weight or even 100 ppm by weight of iron. The pyrolysis oil may also comprise other impurities such as heteroelements notably provided by sulfur compounds, oxygen compounds and/or nitrogen compounds, in contents generally less than 20 000 ppm by weight of heteroelements and preferably less than 10 000 ppm by weight of heteroelements.

The process according to the invention is particularly suitable for treating a pyrolysis oil loaded with impurities. This means a feedstock having the following properties:
- an aromatic content of between 0 and 90% by weight, often between 20% and 90% by weight, and which may be between 50% and 90% by weight;
- a halogen content of between 2 and 5000 ppm by weight, often between 200 and 5000 ppm by weight, and which may be between 500 and 5000 ppm by weight;
- a content of metallic elements of between 10 and 10 000 ppm by weight, often between 2000 and 10 000 ppm by weight, and which may be between 2250 and 5000 ppm by weight;
- including an iron element content of between 0 and 100 ppm by weight, often between 10 and 100 ppm by weight, and which may be between 15 and 100 ppm by weight;
- a silicon element content of between 0 and 1000 ppm by weight, often between 100 and 1000 ppm by weight, and which may be between 200 and 1000 ppm by weight.

The process according to the invention is particularly suitable for treating a pyrolysis oil heavily loaded with impurities. This means a feedstock having the following properties:
- a content of aromatic compounds of between 30% and 70% by weight;
- a content of halogenated compounds of between 500 and 5000 ppm by weight;
- a content of metallic elements of between 300 and 10 000 ppm by weight;
- including a content of iron element of between 15 and 100 ppm by weight;
- a content of silicon element of between 200 and 1000 ppm by weight.

The feedstock of the process according to the invention comprises at least one plastics and/or SRF pyrolysis oil(s). Said feedstock may consist solely of plastics pyrolysis oil(s) or solely of SRF pyrolysis oil(s) or solely of a mixture of plastics and SRF pyrolysis oil(s). Preferably, said feedstock comprises at least 50% by weight, preferably between 50% and 100% by weight, and particularly preferably between 75% and 100% by weight of plastics and/or SRF pyrolysis oil.

The plastics and/or SRF pyrolysis oil may be obtained from a thermal, catalytic pyrolysis treatment or else may be prepared by hydropyrolysis (pyrolysis in the presence of a catalyst and of hydrogen).

The feedstock of the process according to the invention may also comprise a conventional petroleum-based feedstock and/or a feedstock obtained from the conversion of biomass which is then co-treated with the plastics and/or SRF pyrolysis oil.

The conventional petroleum-based feedstock can advantageously be a cut or a mixture of cuts of naphtha, vacuum gas oil, atmospheric residue or vacuum residue type.

The feedstock resulting from the conversion of biomass can advantageously be chosen from vegetable oils, oils from algae or algal oils, fish oils, waste food oils, and fats of vegetable or animal origin, or mixtures of such feedstocks. Said vegetable oils can advantageously be crude or refined, completely or partly, and result from plants chosen from rape, sunflower, soybean, palm, olive, coconut, copra, castor oil plant, cotton plant, peanut oil, linseed oil and sea kale oil, and all the oils resulting, for example, from sunflower or rape by genetic modification or hybridization, this list not being limiting. Said animal fats are advantageously chosen from blubber and fats composed of residues from the food industry or resulting from the catering industries. Frying oils, various animal oils, such as fish oils, tallow or lard, can also be used. The feedstock resulting from the conversion of biomass can also be chosen from feedstocks originating from processes for thermal or catalytic conversions of biomass and/or organic waste, such as oils which are produced from biomass, in particular from lignocellulosic biomass, with various liquefaction methods, such as hydrothermal liquefaction or pyrolysis. The term "biomass" refers to a material derived from recently living organisms, which comprises plants, animals and by-products thereof. The term "lignocellulosic biomass" denotes biomass derived from plants or from by-products thereof. The lignocellulosic biomass is composed of carbohydrate polymers (cellulose, hemicellulose) and of an aromatic polymer (lignin).

The feedstock resulting from the conversion of biomass can also advantageously be chosen from feedstocks resulting from the papermaking industry.

Pretreatment (Optional)

Said feedstock comprising a pyrolysis oil may advantageously be pretreated in an optional pretreatment step a0), prior to the optional selective hydrogenation step a) or hydroconversion step b) when step a) is not present, to obtain a pretreated feedstock which feeds step a) or step b).

This optional pretreatment step a0) makes it possible to reduce the amount of contaminants, in particular the amount of silicon and of metals, which may be present in the feedstock comprising the pyrolysis oil. Thus, an optional step a0) of pretreatment of the feedstock comprising a pyrolysis oil may be performed in particular when said feedstock comprises more than 50 ppm by weight, notably more than 100 ppm by weight, more particularly more than 200 ppm by weight of metallic elements.

Said optional pretreatment step a0) can be carried out by any method known to those skilled in the art which makes it possible to reduce the amount of contaminants. It can in particular comprise a filtration step and/or an electrostatic separation step and/or a step of washing by means of an aqueous solution and/or an adsorption step.

Said optional pretreatment step a0) is advantageously carried out at a temperature of between 0 and 150° C., preferably between 5 and 100° C., and at a pressure between 0.15 and 10.0 MPa abs., preferably between 0.2 and 1.0 MPa abs.

According to a variant, said optional pretreatment step a0) is carried out in an adsorption section operated in the presence of at least one adsorbent, preferably of alumina type, having a specific surface of greater than or equal to 100 m$^2$/g, preferably of greater than or equal to 200 m$^2$/g. The specific surface of said at least one adsorbent is advantageously less than or equal to 600 m$^2$/g, in particular less than or equal to 400 m$^2$/g. The specific surface of the adsorbent is a surface area measured by the BET method, that is to say the specific surface determined by nitrogen adsorption in accordance with standard ASTM D 3663-78 drawn up from the Brunauer-Emmett-Teller method described in the periodical *The Journal of the American Chemical Society*, 6Q, 309 (1938).

Advantageously, said adsorbent comprises less than 1% by weight of metal elements and preferably is devoid of metal elements. Metal elements of the adsorbent should be understood as meaning the elements from groups 6 to 10 of the Periodic Table of the Elements (new IUPAC classification). The residence time of the feedstock in the adsorbent section is generally between 1 and 180 minutes.

Said adsorption section of the optional step a0) comprises at least one adsorption column, preferably comprises at least two adsorption columns, preferentially between two and four adsorption columns, containing said adsorbent. When the adsorption section comprises two adsorption columns, one operating mode can be a "swing" operation, wherein one of the columns is on-line, that is to say in operation, while the other column is in reserve. When the adsorbent of the on-line column is spent, this column is isolated, while the column in reserve is placed on-line, that is to say in operation. The spent adsorbent can subsequently be regenerated in situ and/or replaced with fresh adsorbent in order for the column containing it to be again able to be placed back on-line once the other column has been isolated.

Another operating mode is to have at least two columns operating in series. When the adsorbent of the column placed at the head is spent, this first column is isolated and the spent adsorbent is either regenerated in situ or replaced with fresh adsorbent. The column is subsequently brought back on-line in the last position, and so on. This operation is known as permutable mode, or according to the term PRS for Permutable Reactor System, or also "lead and lag". The combination of at least two adsorption columns makes it possible to overcome the possible and potentially rapid poisoning and/or clogging of the adsorbent due to the combined action of the metallic contaminants, of the diolefins, of the gums obtained from the diolefins and of the insoluble matter that may be present in the pyrolysis oil to be treated. This is because the presence of at least two adsorption columns facilitates the replacement and/or the regeneration of the adsorbent, advantageously without shutdown of the pretreatment unit, indeed even of the process, thus making it possible to reduce the risks of clogging and thus to avoid shutdown of the unit due to clogging, to control the costs and to limit the consumption of adsorbent.

According to another variant, said optional pretreatment step a0) is carried out in a section for washing with an aqueous solution, for example water, or an acidic or basic solution. This washing section can comprise items of equipment which make it possible to bring the feedstock into contact with the aqueous solution and to separate the phases so as to obtain, on the one hand, the pretreated feedstock and, on the other hand, the aqueous solution comprising impurities. These items of equipment can include, for example, a stirred reactor, a decanter, a mixer-decanter and/or a cocurrentwise or countercurrentwise scrubbing column.

Said optional pretreatment step a0) may also optionally be fed with at least a fraction of a recycle stream, advantageously obtained from step d) or from optional step e) of the process, as a mixture with or separately from the feedstock comprising a pyrolysis oil.

Said optional pretreatment step a0) thus makes it possible to obtain a pretreated feedstock which then feeds selective hydrogenation step a) when it is present, or hydroconversion step b).

Selective Hydrogenation Step a) (Optional)

According to the invention, the process may comprise a step a) of selective hydrogenation of the feedstock comprising a pyrolysis oil performed in the presence of hydrogen, under hydrogen pressure and temperature conditions making it possible to maintain said feedstock in the liquid phase and with an amount of soluble hydrogen which is just necessary for a selective hydrogenation of the diolefins present in the pyrolysis oil. The selective hydrogenation of the diolefins in the liquid phase thus makes it possible to avoid or at least to limit the formation of "gums", that is to say the polymerization of the diolefins and thus the formation of oligomers and polymers, which can plug the reaction section of hydrotreatment step c). The styrene compounds, in particular styrene, possibly present in the feedstock can also behave like the diolefins in terms of formation of gums owing to the fact that the double bond of the vinyl group is conjugated with the aromatic nucleus. Said selective hydrogenation step a) makes it possible to obtain a selectively hydrogenated effluent, that is to say an effluent having a reduced content of olefins, in particular of diolefins and possibly of styrene compounds.

According to the invention, said selective hydrogenation step a) is performed in a reaction section fed at least with said feedstock comprising a pyrolysis oil, or with the pretreated feedstock obtained from the optional pretreatment step a0), and a gas stream comprising hydrogen ($H_2$).

Optionally, the reaction section of said step a) may likewise also be fed with at least a fraction of a recycle stream advantageously obtained from step d) or from the optional step e).

Said reaction section involves selective hydrogenation, preferably in a fixed bed, in the presence of at least one selective hydrogenation catalyst, advantageously at an average temperature (or WABT as defined below) of between 100 and 280° C., preferably between 120 and 260° C., preferably between 130 and 250° C., a partial pressure of hydrogen of between 1.0 and 20.0 MPa abs., preferably between 5.0 and 15.0 MPa abs. and at an hourly space velocity (HSV) of between 0.3 and 10.0 h$^{-1}$, preferably between 0.5 and 5.0 h$^{-1}$.

According to the invention, the "average temperature" of a reaction section comprising at least one fixed-bed reactor corresponds to the weight-average bed temperature (WABT), which is well known to those skilled in the art. The average temperature is advantageously determined as a function of the catalytic systems, of the items of equipment, of the configuration of these, which are used. The average temperature (or WABT) is calculated in the following way:

$$WABT=(T_{inlet}+T_{outlet})/2$$

with $T_{inlet}$: the temperature of the effluent at the inlet of the reaction section, $T_{outlet}$: the temperature of the effluent at the outlet of the reaction section.

The hourly space velocity (HSV) is defined here as the ratio of the hourly volume flow rate of the feedstock comprising the pyrolysis oil, which has optionally been pretreated, to the volume of catalyst(s).

The amount of the gas stream comprising hydrogen ($H_2$) feeding said reaction section of step a) is advantageously such that the hydrogen coverage is between 1 and 200 $Sm^3$ of hydrogen per $m^3$ of feedstock ($Sm^3/m^3$), preferably between 1 and 50 $Sm^3$ of hydrogen per $m^3$ of feedstock ($Sm^3/m^3$), in a preferred way between 5 and 20 $Sm^3$ of hydrogen per $m^3$ of feedstock ($Sm^3/m^3$).

The hydrogen coverage is defined as the ratio of the flow rate by volume of hydrogen, taken under standard temperature and pressure conditions, relative to the flow rate by volume of "fresh" feedstock, that is to say of the feedstock to be treated, which has optionally been pretreated, without taking into account the possible recycled fraction, at 15° C. (in standard $m^3$, denoted $Sm^3$, of $H_2$ per $m^3$ of feedstock).

The gas stream comprising hydrogen, which feeds the reaction section of step a), may consist of a supply of hydrogen and/or of recycled hydrogen advantageously obtained from step d) or from the optional step e).

Selective hydrogenation step a) is preferably performed in a fixed bed. It can also be carried out in an ebullated bed or in a moving bed.

Advantageously, the reaction section of said step a) comprises between one and five reactors. According to a specific embodiment of the invention, the reaction section comprises between two and five reactors, which operate in permutable mode, referred to according to the term PRS for Permutable Reactor System or also "lead and lag". The combination of at least two reactors in PRS mode makes it possible to isolate a reactor, to discharge the spent catalyst, to recharge the reactor with fresh catalyst and to bring said reactor back into service without shutting down the process. The PRS technology is described in particular in patent FR 2 681 871.

According to a particularly preferred variant, the selective hydrogenation reaction section of step a) comprises two reactors operating in permutable mode.

Advantageously, reactor internals, for example of filter plate type, can be used to prevent the plugging of the reactor(s). An example of a filter plate is described in patent FR 3 051 375.

Advantageously, said selective hydrogenation catalyst comprises a support, preferably a mineral support, and a hydro-dehydrogenating function.

According to a variant, the hydro-dehydrogenating function comprises in particular at least one element from group VIII, preferably chosen from nickel and cobalt, and at least one element from group VIB, preferably chosen from molybdenum and tungsten. According to this variant, the total content, expressed as oxides, of the metal elements from groups VIB and VIII is preferably between 1% and 40% by weight, preferentially from 5% to 30% by weight, relative to the total weight of the catalyst. When the metal is cobalt or nickel, the metal content is expressed as CoO and NiO respectively. When the metal is molybdenum or tungsten, the metal content is expressed as $MoO_3$ and $WO_3$ respectively.

The ratio by weight, expressed as metal oxide, of the metal (or metals) from group VIB relative to the metal (or to the metals) from group VIII is preferably of between 1 and 20 and in a preferred way between 2 and 10.

According to this variant, the reaction section of said step a) comprises, for example, a hydrogenation catalyst comprising between 0.5% and 12% by weight of nickel, preferably between 1% and 10% by weight of nickel (expressed as nickel oxide NiO relative to the weight of said catalyst), and between 1% and 30% by weight of molybdenum, preferably between 3% and 20% by weight of molybdenum (expressed as molybdenum oxide $MoO_3$ relative to the weight of said catalyst), on a preferably inorganic support, preferably on an alumina support.

According to another variant, the hydro-dehydrogenating function comprises, and preferably consists of, at least one element from group VIII, preferably nickel. According to this variant, the nickel content, expressed as NiO, is preferably between 1% and 50% by weight and preferably between 10% and 30% by weight relative to the weight of said catalyst. This type of catalyst is preferably used in its reduced form, on a preferably inorganic support, preferably on an alumina support.

The support of said at least one selective hydrogenation catalyst is preferably chosen from alumina, silica, silica-aluminas, magnesia, clays and mixtures thereof. Said support can include dopant compounds, in particular oxides chosen from boron oxide, especially boron trioxide, zirconia, ceria, titanium oxide, phosphorus pentoxide and a mixture of these oxides. Preferably, said at least one selective hydrogenation catalyst comprises an alumina support, optionally doped with phosphorus and optionally boron. When phosphorus pentoxide $P_2O_5$ is present, its concentration is less than 10% by weight, relative to the weight of the alumina, and advantageously at least 0.001% by weight, relative to the total weight of the alumina. When boron trioxide $B_2O_3$ is present, its concentration is less than 10% by weight, relative to the weight of the alumina, and advantageously at least 0.001%, relative to the total weight of the alumina. The alumina used can, for example, be a γ (gamma) or η (eta) alumina.

Said selective hydrogenation catalyst is, for example, in the form of extrudates.

Very preferably, in order to hydrogenate the diolefins as selectively as possible, step a) may also use, in addition to the selective hydrogenation catalysts described above, at least one selective hydrogenation catalyst used in step a) comprising less than 1% by weight of nickel and at least 0.1% by weight of nickel, preferably 0.5% by weight of nickel, expressed as nickel oxide NiO relative to the weight of said catalyst, and less than 5% by weight of molybdenum and at least 0.1% by weight of molybdenum, preferably 0.5% by weight of molybdenum, expressed as molybdenum oxide $MoO_3$ relative to the weight of said catalyst, on an alumina support. This catalyst sparingly charged with metals is preferably placed upstream of the selective hydrogenation catalysts described above.

The content of impurities, in particular of diolefins, of the hydrogenated effluent obtained on conclusion of step a) is reduced relative to that of the same impurities, in particular diolefins, included in the feedstock of the process. Selective hydrogenation step a) generally makes it possible to convert at least 90% and preferably at least 99% of the diolefins contained in the initial feedstock. Step a) also makes it possible to remove, at least in part, other contaminants, such as, for example, silicon. The hydrogenated effluent, obtained on conclusion of the selective hydrogenation step a), is sent, preferably directly, to hydroconversion step b).

Hydroconversion Step b)

According to the invention, the treatment process comprises a hydroconversion step b) performed in a hydroconversion reaction section, involving at least one ebullated-bed reactor, entrained-bed reactor and/or moving-bed reactor, comprising at least one hydroconversion catalyst, said hydroconversion reaction section being fed at least with said feedstock or with said hydrogenated effluent obtained from step a), to obtain a hydroconverted effluent.

Advantageously, step b) involves hydroconversion reactions well known to those skilled in the art, and more particularly hydrotreatment reactions such as hydrogenation of olefins, aromatics, halogenated compounds, hydrodemetallization, hydrodesulfurization, hydrodeazotization, etc. and hydrocracking reactions (HCK) which lead to the opening of the naphthenic ring or the fractionation of paraffins into several fragments of lower molecular weight, thermal cracking and polycondensation reactions (formation of coke) although the latter are not desired.

Advantageously, said hydroconversion reaction section is operated at a pressure equivalent to that used in the reaction section of the selective hydrogenation step a) when it is present, but at a higher temperature than that of the reaction section of the selective hydrogenation step a). Thus, said hydroconversion reaction section, this being true regardless of whether an ebullated bed, entrained bed and/or moving bed reaction section is used, is advantageously operated at a hydroconversion temperature of between 250 and 450° C., preferably between 350 and 420° C., at a partial pressure of hydrogen of between 1.0 and 20.0 MPa abs., more preferentially between 3.0 and 15.0 MPa abs., and at an hourly space velocity (HSV) of between 0.05 and 10.0 $h^{-1}$, preferably between 0.1 and 5.0 $h^{-1}$.

According to the invention, the "hydroconversion temperature" corresponds to an average temperature in the hydroconversion reaction section of step b). The hydroconversion temperature is advantageously determined as a function of the catalytic systems, of the equipment and of the configuration thereof, by those skilled in the art. For example, the ebullated bed hydroconversion temperature is determined by taking the arithmetic mean of the temperature measurements in the catalytic bed. The hourly space velocity (HSV) is defined here as the ratio of the hourly flow rate by volume of the hydrogenated effluent resulting from step a) per volume of catalyst(s). The hydrogen coverage in step b) is advantageously of between 50 and 1000 $Sm^3$ of hydrogen per $m^3$ of fresh feedstock, preferably between 60 and 500 $Sm^3$ of hydrogen per $m^3$ of fresh feedstock and in a preferred way between 100 and 300 $Sm^3$ of hydrogen per $m^3$ of fresh feedstock. The hydrogen coverage is defined as the ratio of the flow rate by volume of hydrogen, taken under standard temperature and pressure conditions, with respect to the flow rate by volume of "fresh" feedstock, that is to say of the feedstock to be treated, which has optionally been pre-treated, without taking into account the possible recycled fraction, at 15° C. (in standard $m^3$, denoted $Sm^3$, of $H_2$ per $m^3$ of feedstock). The gas stream comprising hydrogen, which feeds the reaction section of step b), may consist of a supply of hydrogen and/or of recycled hydrogen advantageously obtained from step d) or from the optional step e).

An important characteristic of the process according to the invention is the fact that the hydroconversion step is performed in a reaction section allowing the addition of fresh catalyst and the withdrawal of spent catalyst without shutting down the unit. Such systems are hydroconversion units operated in an ebullated bed, in an entrained bed and/or even in a moving bed. The addition of fresh catalyst and withdrawal of spent catalyst can thus be performed continuously, semi-continuously or periodically.

Ebullated-Bed Hydroconversion Step b)

Thus, according to a first variant, hydroconversion step b) is performed in a hydroconversion reaction section involving at least one ebullated bed reactor.

The functioning of the ebullated bed reactor, including the recycling of reactor liquids upwards through the stirred bed of catalyst, is generally well known. A mixture of feedstock and hydrogen is passed from the bottom upwards over a bed of catalytic particles at a flow rate such that the particles are subjected to a forced random motion whereas the liquid and gas pass through the bed from the bottom upwards. The movement of the catalytic bed is controlled by a flow of recycle liquid so that, in the steady state, the mass of the catalyst does not rise above a definable level in the reactor. Vapors and the liquid being hydrogenated pass through the upper level of the bed of catalytic particles to reach a zone substantially free of catalyst, and they are then discharged from the upper part of the reactor. A fraction of the reactor liquids is continuously recycled into the reactor. Ebullated bed technologies use supported catalysts, generally in the form of extrudates or beads of which the diameter is generally of the order of 1 mm or less than 1 mm. The catalysts remain inside the reactors and are not discharged with the products. The catalytic activity can be kept constant by on-line replacement of the catalyst. It is thus not necessary to shut down the unit in order to change the spent catalyst, or to increase the reaction temperatures along the cycle in order to compensate for deactivation. Furthermore, working under constant operating conditions makes it possible to obtain constant product yields and qualities along the cycle. Also, because the catalyst is kept in agitation by a significant recycling of liquid, the pressure drop on the reactor remains low and constant, and the reaction exotherms are rapidly averaged over the catalytic bed.

The spent catalyst is partly replaced with fresh catalyst by withdrawal from the bottom of the reactor and introducing, either at the top of the reactor or at the bottom of the reactor, fresh or new catalyst at regular time intervals, that is to say by example in bursts or almost continuously. Fresh catalyst can be introduced, for example, every day. The rate of replacement of the spent catalyst with fresh catalyst may be, for example, from about 0.01 kilogram to about 10 kilograms per cubic metre of feedstock. This withdrawal and this replacement are performed using devices which enable continuous functioning of this hydroconversion step. The unit usually includes an internal recirculation pump for maintaining the catalyst in an ebullated bed by continuous recycling of at least a portion of the liquid withdrawn at the top of the reactor and reinjected into the bottom of the reactor. It is also possible to send the spent catalyst withdrawn from the reactor to a regeneration zone, wherein the carbon and sulfur which it contains are removed, and then to return this regenerated catalyst to the hydroconversion step. It is also possible to send the regenerated catalyst to a rejuvenation zone wherein a treatment is performed aimed at improving the activity of the catalyst (presulfurization, additivation, etc.), then to return this rejuvenated catalyst to the hydroconversion step.

Catalysts used in an ebullated bed are widely marketed. These are granular catalysts of which the size never reaches that of the catalysts used in an entrained bed. The catalyst is usually in the form of extrudates or beads. Typically, they contain at least one hydro-dehydrogenating element deposited on an amorphous support. Generally, the supported catalyst comprises a group VIII metal chosen from the group formed by Ni, Pd, Pt, Co, Rh and/or Ru, optionally a group VIB metal chosen from the group Mo and/or W, on an amorphous mineral support chosen from the group formed by alumina, silica, silica-aluminas, magnesia, clays and mixtures of at least two of these minerals. CoMo/alumina and NiMo/alumina catalysts are the most common.

The total content of oxides of metallic elements from groups VIB and VIII is preferably between 0.1% and 40% by weight and preferentially from 5% to 35% by weight relative to the total weight of the catalyst. The ratio by weight, expressed as metal oxide, of the metal (or metals) from group VIB, relative to the metal (or metals) from group VIII, is preferably of between 1.0 and 20, in a preferred way between 2.0 and 10. For example, the hydroconversion reaction section of step b) of the process comprises a hydroconversion catalyst comprising between 0.5% and 10% by weight of nickel, preferably between 1% and 8% by weight of nickel, expressed as nickel oxide NiO relative to the total weight of the hydroconversion catalyst, and between 1.0% and 30% by weight of molybdenum, preferably between 3.0% and 29% by weight of molybdenum, expressed as molybdenum oxide $MoO_3$ relative to the total weight of the hydroconversion catalyst, on a mineral support, preferably on an alumina support.

The support for said hydroconversion catalyst is advantageously chosen from alumina, silica, silica-aluminas, magnesia, clays and mixtures thereof. Said support can additionally include dopant compounds, in particular oxides chosen from boron oxide, especially boron trioxide, zirconia, ceria, titanium oxide, phosphorus pentoxide and a mixture of these oxides. Preferably, said hydroconversion catalyst comprises an alumina support, preferably an alumina support doped with phosphorus and optionally boron. When phosphorus pentoxide $P_2O_5$ is present, its concentration is less than 10% by weight, relative to the weight of the alumina, and advantageously at least 0.001% by weight, relative to the total weight of the alumina. When boron trioxide $B_2O_3$ is present, its concentration is less than 10% by weight, relative to the weight of the alumina, and advantageously at least 0.001% by weight, relative to the total weight of the alumina. The alumina used can, for example, be a γ (gamma) or η (eta) alumina.

Said hydroconversion catalyst is, for example, in the form of extrudates or beads.

Advantageously, said hydroconversion catalyst used in step b) of the process has a specific surface area of greater than or equal to 250 $m^2/g$, preferably greater than or equal to 300 $m^2/g$. The specific surface area of said hydroconversion catalyst is advantageously less than or equal to 800 $m^2/g$, preferably less than or equal to 600 $m^2/g$, in particular less than or equal to 400 $m^2/g$. The specific surface of the hydroconversion catalyst is measured by the BET method, that is to say the specific surface determined by nitrogen adsorption in accordance with standard ASTM D 3663 drawn up from the Brunauer-Emmett-Teller method described in the periodical *The Journal of the American Chemical Society*, 6Q, 309 (1938). Such a specific surface makes it possible to further improve the removal of the contaminants, in particular of the metals, such as silicon.

Hydroconversion catalysts are distinguished from hydrotreatment catalysts notably by a porosity adapted to the treatment of impurities, notably metallic impurities, and in particular by the presence of macroporosity.

According to another aspect of the invention, the hydroconversion catalyst as described above also comprises one or more organic compounds containing oxygen and/or nitrogen and/or sulfur. Such a catalyst is often denoted by the term "additivated catalyst". Generally, the organic compound is chosen from a compound comprising one or more chemical functions chosen from a carboxylic, alcohol, thiol, thioether, sulfone, sulfoxide, ether, aldehyde, ketone, ester, carbonate, amine, nitrile, imide, oxime, urea and amide function or also compounds including a furan ring or also sugars.

Entrained-Bed Hydroconversion Step b)

According to a second variant, hydroconversion step b) is performed in a hydroconversion reaction section involving at least one entrained-bed reactor, also called a slurry reactor. The feedstock, the hydrogen and the catalyst are injected from below and flow as an ascending stream. The hydroconverted effluent and the unconsumed hydrogen and the catalyst are withdrawn from the top. The slurry hydroconversion technologies use a catalyst dispersed in the form of very small particles, the size of which is a few tens of microns or less (generally 0.001 to 100 μm). The catalysts, or the precursors thereof, are injected with the feedstock to be converted at the inlet of the reactors. The catalysts pass through the reactors with the feedstocks and the products undergoing conversion, and they are then entrained with the reaction products out of the reactors. They are found after separation in the heaviest fraction.

The slurry catalyst is a catalyst preferably containing at least one element chosen from the group formed by Mo, Fe, Ni, W, Co, V and Ru. These catalysts are generally monometallic or bimetallic (for example by combining a non-noble group VIIIB element (Co, Ni, Fe) and a group VIB element (Mo, W).

The catalysts used may be powders of heterogeneous solids (such as natural ores, iron sulfate, etc.), dispersed catalysts obtained from water-soluble precursors ("water soluble dispersed catalyst") such as phosphomolybdic acid, ammonium molybdate, or a mixture of Mo or Ni oxide with aqueous ammonia.

Preferably, the catalysts used come from precursors that are soluble in an organic phase ("oil soluble dispersed catalyst"). The precursors are organometallic compounds such as naphthanates of Mo, Co, Fe, or Ni or such as multi-carbonyl compounds of these metals, for example 2-ethylhexanoates of Mo or Ni, acetylacetonates of Mo or Ni, salts of C7-C12 fatty acids of Mo or W, etc. They can be used in the presence of a surfactant to improve the dispersion of metals, when the catalyst is bimetallic.

The catalysts are in the form of dispersed particles, which may or may not be colloidal depending on the nature of the catalyst. Such precursors and catalysts that may be used in the process according to the invention are widely described in the literature.

The concentration of the catalyst, expressed as a metallic element, is generally between 1 and 10 000 ppm relative to the feedstock.

In general, the catalysts are prepared before being injected into the feedstock. The preparation process is adapted according to the state and nature of the precursor. In all cases, the precursor is sulfurized (ex-situ or in-situ) to form the catalyst dispersed in the feedstock.

For the preferred case of "oil-soluble" catalysts, in a typical process, the precursor is mixed with a carbon-based feedstock (which may be part of the feedstock to be treated, an external feedstock, a recycled fraction, etc.), the mixture is optionally at least partially dried, then or simultaneously sulfurized by adding a sulfur compound ($H_2S$ preferred) and heated. The preparations of these catalysts are described in the prior art.

Additives can be added during the preparation of the catalyst or to the slurried catalyst before it is injected into the reactor. These additives are described in the literature.

The preferred solid additives are mineral oxides such as alumina, silica, mixed Al/Si oxides, supported spent catalysts (for example on alumina and/or silica) containing at least one group VIII element (such as Ni, Co) and/or at least one element of group VIB (such as Mo, W). Mention will be made, for example, of the catalysts described in patent application US 2008/177124. Carbon-based solids with a low hydrogen content (for example 4% hydrogen) such as coke, optionally pretreated, may also be used. Mixtures of such additives may also be used. Their particle sizes are preferably less than 1 mm. The content of any solid additive present at the inlet of the entrained bed hydroconversion reaction zone is between 0 and 10% by weight, preferentially between 1% and 3% by weight, and the content of the catalytic solutions is between 0 and 10% by weight, preferably between 0 and 1% by weight relative to the weight of the injected feedstock.

When hydroconversion step b) is performed in an entrained bed reactor, a filtration step to recover the catalyst is necessary before sending the hydroconverted effluent to step c).

Moving-Bed Hydroconversion Step b)

According to a third variant, hydroconversion step b) is performed in a hydroconversion reaction section involving at least one moving bed reactor.

The feedstock and the hydrogen can flow upward in moving bed reactors (countercurrent processes) or downward (cocurrent processes). The catalyst gradually flows by gravity from top to bottom and in plug flow inside the catalytic zone. It is withdrawn from below by any appropriate means, for example an elevator (called a "lift"). An in-line device ensures the semi-continuous renewal of the catalyst of the moving bed reactors: some of the spent catalyst is drawn off at the bottom of the reactor while fresh catalyst is introduced at the top of the reactor. The temperature is controlled therein by inter- or intra-reactor quenching.

Preferably, spherical catalysts with a diameter of between 0.5 and 6 mm and preferably between 1 and 3 mm are used rather than extruded catalysts, to obtain better flow. When the used catalyst is withdrawn from the bottom of the reactor, the entire catalytic bed moving in plug flow, moves downwards by a height corresponding to the volume of catalyst withdrawn. The degree of expansion of the catalytic bed operating as a moving bed is advantageously less than 15%, preferably less than 10%, preferably less than 5% and more preferably less than 2%. The degree of expansion is measured according to a method known to those skilled in the art.

The hydroconversion catalyst used in the moving bed of step b) of the process according to the invention is advantageously a catalyst comprising a support, preferably an amorphous support and very preferably alumina, and at least one group VIII metal chosen from nickel and cobalt, and preferably nickel, said group VIII element preferably being used in combination with at least one group VIB metal chosen from molybdenum and tungsten, and preferably the group VIB metal is molybdenum. Preferably, the hydroconversion catalyst comprises nickel as group VIII element and molybdenum as group VIB element. The nickel content is advantageously between 0.5% and 10% expressed by weight of nickel oxide (NiO) and preferably between 1% and 6% by weight, and the molybdenum content is advantageously between 1% and 30% expressed by weight of molybdenum trioxide ($MoO_3$), and preferably between 4% and 20% by weight, the percentages being expressed as weight percentage relative to the total weight of the catalyst. This catalyst is advantageously in the form of extrudates or beads. This catalyst may also advantageously contain phosphorus and preferably a content of phosphorus pentoxide $P_2O_5$ of less than 20% and preferably less than 10% by weight, the percentages being expressed as weight percentage relative to the total weight of the catalyst. The catalyst may also be a catalyst supplemented with an organic compound as described above.

According to yet another variant, hydroconversion step b) may be performed in a hydroconversion reaction section involving a combination of at least one ebullated bed reactor, at least one entrained bed reactor and/or at least one moving bed reactor, in any order.

Preferably, step b) is performed in a hydroconversion reaction section involving at least one ebullated bed reactor.

Hydrotreatment Step c)

According to the invention, the treatment process comprises a hydrotreatment step c) implemented in a hydrotreatment reaction section, implementing at least one fixed-bed reactor having n catalytic beds, n being an integer greater than or equal to 1, each comprising at least one hydrotreatment catalyst, said hydrotreatment reaction section being supplied with at least a portion of said hydroconverted effluent from step b) and a gas stream comprising hydrogen, to obtain a hydrotreated effluent, said hydrotreatment step c) being carried out after hydroconversion step b) without an intermediate separation step between hydroconversion step b) and hydrotreatment step c).

According to the invention, the effluent from hydroconversion step b) does not undergo any step of intermediate separation of a gas stream between hydroconversion step b) and hydrotreatment step c). This configuration can be described as an integrated scheme.

In the present invention, the expression "without any intermediate separation step" is understood to mean the fact that at least a portion of the effluent from hydroconversion step b) is introduced in the section allowing the implementation of hydrotreatment step c) without changing chemical composition and without significant pressure loss. The term "separation" is understood to mean one or more separating drums and/or one or more stripping or distillation columns, it being possible for these pieces of equipment to operate at different temperatures or pressures. The expression "significant pressure loss" is understood to mean a pressure loss caused by an expansion turbine or valve, which could be estimated at a pressure loss of more than 10% of the total pressure. Those skilled in the art generally use these pressure losses or expansions during the separation steps.

In one embodiment of the process according to the invention, all of the effluent from hydroconversion step b) is introduced into the section allowing the implementation of hydrotreatment step c).

In another embodiment, only part of the effluent from hydroconversion step b) is introduced into the section allowing the implementation of hydrotreatment step c). However, this embodiment is not in contradiction to the fact that the process does not contain any intermediate separation step. This embodiment may consist in dividing the effluent from hydroconversion step b) into two streams having the same composition, one going to hydrotreatment step c) located downstream of said hydroconversion step. This embodiment can therefore be likened to a partial bypass of hydrotreatment section c) but, for the portion of the effluent of the hydroconversion section b) going to the hydrotreatment section c), there is neither separation, nor modification of the chemical composition, nor significant pressure loss. Another variant of this bypass embodiment can consist of dividing the effluent from hydroconversion step b) into several streams having the same composition, and in sending one or more of these streams to the inlet of a first hydrotreatment reactor c) and one or more other of these streams to one or more hydrotreatment reactors c) downstream.

Advantageously, step c) employs the hydrotreatment reactions well known to those skilled in the art, and more particularly hydrotreatment reactions such as the hydrogenation of aromatics, hydrodesulfurization and hydrodenitrogenation. Furthermore, the hydrogenation of the remaining halogenated compounds and olefins and also the hydrodemetallization are continued.

Said hydrotreatment reaction section is advantageously operated at an average hydrotreatment temperature of between 250 and 430° C., preferably between 300 and 400° C., at a partial pressure of hydrogen of between 1.0 and 20.0 MPa abs., preferably between 3.0 and 15.0 MPa abs., and at an hourly space velocity (HSV) of between 0.1 and 10.0 h$^{-1}$, preferably between 0.1 and 5.0 h$^{-1}$, preferentially between 0.2 and 2.0 h$^{-1}$, preferably between 0.2 and 1.0 h$^{-1}$. The hydrogen coverage in step c) is advantageously between 50 and 2000 Nm$^3$ of hydrogen per m$^3$ of feedstock which feeds step c), preferably between 100 and 1000 Nm$^3$ of hydrogen per m$^3$ of feedstock which feeds step c), preferably between 120 and 800 Nm$^3$ of hydrogen per m$^3$ of feedstock which feeds step c).

The definitions of the average temperature (WABT), of the HSV and of the hydrogen coverage correspond to those described above in the selective hydrogenation step a).

The gas stream comprising hydrogen, which feeds the reaction section of step c), may consist of a supply of hydrogen and/or of recycled hydrogen advantageously obtained from step d) or from the optional step e).

Advantageously, said step c) is carried out in a hydrotreatment reaction section comprising at least one, preferably between one and five, fixed-bed reactor(s) having n catalytic beds, n being an integer greater than or equal to 1, preferably of between 1 and 10, in a preferred way between 2 and 5, said bed(s) each comprising at least one and preferably not more than ten hydrotreatment catalyst(s). When a reactor comprises several catalytic beds, that is to say at least two, preferably between two and ten, in a preferred way between two and five, catalytic beds, said catalytic beds are preferably arranged in series in said reactor.

When step c) is carried out in a hydrotreatment reaction section comprising several reactors, preferably two reactors, these reactors can operate in series and/or in parallel and/or in permutable (or PRS) mode and/or in swing mode. The various optional operating modes, PRS mode (or lead and lag) and swing mode, are well known to those skilled in the art and are advantageously defined above.

In another embodiment of the invention, said hydrotreatment reaction section comprises a single fixed-bed reactor containing n catalytic beds, n being an integer greater than or equal to one, preferably of between one and ten, in a preferred way of between two and five.

In order to avoid carrying catalyst fines and/or catalysts from hydroconversion step b) into said hydrotreatment reaction section b), recovery means can be placed upstream or at the inlet of said hydrotreatment reaction section b), for example one or more filter(s) or even reactor internals, for example of the filter plate type, can be used. An example of a filter plate is described in patent FR 3 051 375.

Advantageously, said hydrotreatment catalyst used in said step c) can be chosen from known hydrodemetallization, hydrotreatment or silicon-scavenging catalysts used in particular for the treatment of petroleum-based cuts, and combinations thereof. Known hydrodemetallization catalysts are, for example, those described in patents EP 0 113 297, EP 0 113 284, U.S. Pat. Nos. 5,221,656, 5,827,421, 7,119, 045, 5,622,616 and 5,089,463. Known hydrotreatment catalysts are, for example, those described in patents EP 0 113 297, EP 0 113 284, U.S. Pat. No. 6,589,908, 4,818,743 or 6,332,976. Known silicon-scavenging catalysts are, for example, those described in patent applications CN 102051202 and US 2007/080099.

In particular, said hydrotreatment catalyst comprises a support, preferably an inorganic support, and at least one metal element having a hydro-dehydrogenating function. Said metal element having a hydro-dehydrogenating function advantageously comprises at least one element from group VIII, preferably chosen from the group consisting of nickel and cobalt, and/or at least one element from group VIB, preferably chosen from the group consisting of molybdenum and tungsten. The total content of oxides of metallic elements from groups VIB and VIII is preferably between 0.1% and 40% by weight and preferentially from 5% to 35% by weight relative to the total weight of the catalyst. The ratio by weight, expressed as metal oxide, of the metal (or metals) from group VIB, relative to the metal (or metals) from group VIII, is preferably of between 1.0 and 20, in a preferred way between 2.0 and 10. For example, the hydrotreatment reaction section of step c) of the process comprises a hydrotreatment catalyst comprising between 0.5% and 10% by weight of nickel, preferably between 1% and 8% by weight of nickel, expressed as nickel oxide NiO relative to the total weight of the hydrotreatment catalyst, and between 1.0% and 30% by total weight of molybdenum and/or tungsten, preferably between 3.0% and 29% by weight, expressed as molybdenum oxide MoO$_3$ or tungsten oxide WO$_3$ relative to the total weight of the hydrotreatment catalyst, on a mineral support.

The support of said hydrotreatment catalyst is advantageously chosen from alumina, silica, silica-aluminas, magnesia, clays and mixtures thereof. Said support may also advantageously contain dopant compounds, notably oxides chosen from boron oxide, in particular boron trioxide, zirconia, ceria, titanium oxide, phosphorus pentoxide and a mixture of these oxides. Preferably, said hydrotreatment catalyst comprises an alumina support, in a preferred way an alumina support doped with phosphorus and optionally boron. When phosphorus pentoxide P$_2$O$_5$ is present, its concentration is less than 10% by weight, relative to the weight of the alumina, and advantageously at least 0.001% by weight, relative to the total weight of the alumina. When boron trioxide $B_2O_5$ is present, its concentration is less than 10% by weight, relative to the weight of the alumina, and advantageously at least 0.001% by weight, relative to the total weight of the alumina. The alumina used can, for example, be a γ (gamma) or η (eta) alumina.

Said hydrotreatment catalyst is, for example, in the form of extrudates.

Advantageously, said hydrotreatment catalyst used in step c) of the process has a specific surface area of greater than or equal to 250 $m^2/g$, preferably greater than or equal to 300 $m^2/g$. The specific surface area of said hydrotreatment catalyst is advantageously less than or equal to 800 $m^2/g$, preferably less than or equal to 600 $m^2/g$, in particular less than or equal to 400 $m^2/g$. The specific surface of the hydrotreatment catalyst is measured by the BET method, that is to say the specific surface determined by nitrogen adsorption in accordance with standard ASTM D 3663 drawn up from the Brunauer-Emmett-Teller method described in the periodical *The Journal of the American Chemical Society*, 6Q, 309 (1938). Such a specific surface makes it possible to further improve the removal of the contaminants, in particular of the metals, such as silicon.

According to another aspect of the invention, the hydrotreatment catalyst as described above additionally comprises one or more organic compounds containing oxygen and/or nitrogen and/or sulfur. Such a catalyst is often denoted by the term "additivated catalyst". Generally, the organic compound is chosen from a compound comprising one or more chemical functions chosen from a carboxylic, alcohol, thiol, thioether, sulfone, sulfoxide, ether, aldehyde, ketone, ester, carbonate, amine, nitrile, imide, oxime, urea and amide function or also compounds including a furan ring or also sugars.

Advantageously, hydrotreatment step c) allows the hydrogenation of at least 80%, and preferably of all, of the remaining olefins, but also the conversion, at least partly, of other impurities present in the feedstock, such as the aromatic compounds, metal compounds, sulfur compounds, nitrogen compounds, halogenated compounds (in particular chlorinated compounds), oxygenated compounds. Preferably, the nitrogen content at the outlet of step c) is less than 10 ppm by weight. Step c) can also make it possible to further reduce the content of contaminants, such as that of metals, in particular the silicon content. Preferably, the metal content at the outlet of step c) is less than 10 ppm by weight and in a preferred way less than 2 ppm by weight, and the silicon content is less than 5 ppm by weight.

Hydrocracking Step c') (Optional)

According to one variant, the process of the invention may comprise a hydrocracking step c') performed either directly after hydrotreatment step c), or after fractionation step e) on a hydrocarbon cut comprising compounds with a boiling point greater than 175° C.

Advantageously, step c') implements hydrocracking reactions that are well known to those skilled in the art, and more particularly makes it possible to convert the heavy compounds, for example compounds with a boiling point of greater than 175° C., into compounds with a boiling point of less than or equal to 175° C. contained in the hydrotreated effluent obtained from step c) or separated during the optional fractionation step e). Other reactions, such as the hydrogenation of olefins or aromatics, hydrodemetallization, hydrodesulfurization, hydrodenitrogenation, and the like, can be pursued.

The compounds with a boiling point of greater than 175° C. have a high BMCI and contain, relative to lighter compounds, more naphthenic, naphthenic-aromatic and aromatic compounds, thus leading to a higher C/H ratio. This high ratio is a cause of coking in the steam cracker, thus requiring steam cracking furnaces dedicated to this cut. When it is desired to minimize the yield of these heavy compounds (diesel cut) and to maximize the yield of light compounds (naphtha cut), these compounds can be at least partly converted into light compounds by hydrocracking, a cut generally favored for a steam cracking unit.

Thus, the process of the invention can comprise a hydrocracking step c') performed in a hydrocracking reaction section, using at least one fixed bed containing n catalytic beds, n being an integer greater than or equal to 1, each comprising at least one hydrocracking catalyst, said hydrocracking reaction section being fed with said hydrotreated effluent obtained from step c) and/or with the cut comprising compounds with a boiling point greater than 175° C. obtained from step e) and a gas stream comprising hydrogen, said hydrocracking reaction section being used at an average temperature of between 250 and 450° C., a partial pressure of hydrogen of between 1.5 and 20.0 MPa abs. and an hourly space velocity of between 0.1 and 10.0 $h^{-1}$, to obtain a hydrocracked effluent which is sent to separation step d).

Thus, said hydrocracking reaction section is advantageously employed at an average temperature of between 250 and 450° C., preferably between 320 and 440° C., at a hydrogen partial pressure between 1.5 and 20.0 MPa abs., preferably between 2 and 18.0 MPa abs., and at an hourly space velocity (HSV) between 0.1 and 10.0 $h^{-1}$, preferably between 0.1 and 5.0 $h^{-1}$, preferentially between 0.2 and 4 $h^{-1}$. The hydrogen coverage in step c) is advantageously between 80 and 2000 $Sm^3$ of hydrogen per $m^3$ of fresh feedstock which feeds step a) and preferably between 200 and 1800 $Sm^3$ of hydrogen per $m^3$ of fresh feedstock which feeds step a). The definitions of the average temperature (WABT), of the HSV and of the hydrogen coverage correspond to those described above in the selective hydrogenation step a).

Advantageously, said hydrocracking reaction section is implemented at a pressure equivalent to that used in the reaction section of hydrotreatment step c).

Advantageously, said step c') is carried out in a hydrocracking reaction section comprising at least one, preferably between one and five, fixed-bed reactor(s) having n catalytic beds, n being an integer greater than or equal to 1, preferably of between 1 and 10, in a preferred way between 2 and 5, said bed(s) each comprising at least one and preferably not more than ten hydrocracking catalyst(s). When a reactor comprises several catalytic beds, that is to say at least two, preferably between two and ten, in a preferred way between two and five, catalytic beds, said catalytic beds are preferably arranged in series in said reactor.

Hydrotreatment step c) and hydrocracking step c') may advantageously be performed in one and the same reactor or in different reactors. When they are performed in the same reactor, the reactor comprises several catalytic beds, the first catalytic beds comprising the hydrotreatment catalyst(s) and the following catalytic beds comprising the hydrocracking catalyst(s).

The hydrocracking step can be performed in one step (step c') or two steps (steps c') and c")). When it is performed in two steps, a fractionation of the effluent obtained from the first hydrocracking step c') is carried out, making it possible to obtain a cut comprising compounds with a boiling point greater than 175° C. (diesel cut) during steps d) and e), which cut is introduced into the second hydrocracking step c") comprising a dedicated second hydrocracking reaction section different from the first hydrocracking reaction section c'). This configuration is particularly suitable when it is desired to produce only a naphtha cut.

The second hydrocracking step c") performed in a hydrocracking reaction section, using at least one fixed bed containing n catalytic beds, n being an integer greater than or equal to 1, each comprising at least one hydrocracking catalyst, said hydrocracking reaction section being fed at least with the cut comprising compounds with a boiling point of greater than 175° C. obtained from step e) and a gas stream comprising hydrogen, said hydrocracking reaction section being used at an average temperature of between 250 and 450° C., a partial pressure of hydrogen of between 1.5 and 20.0 MPa abs. and an hourly space velocity of between 0.1 and 10.0 $h^{-1}$, to obtain a hydrocracked effluent which is sent to separation step d). The preferred operating conditions and the catalysts used in the second hydrocracking step are those described for the first hydrocracking step. The operating conditions and catalysts used in the two hydrocracking steps can be identical or different.

Said second hydrocracking step is preferably carried out in a hydrocracking reaction section comprising at least one, preferably between one and five, fixed-bed reactor(s) having n catalytic beds, n being an integer greater than or equal to one, preferably of between one and ten, in a preferred way of between two and five, said bed(s) each comprising at least one, and preferably not more than ten, hydrocracking catalyst(s).

These operating conditions used in the hydrocracking step(s) generally make it possible to obtain conversions per pass, into products having at least 80% by volume of compounds having boiling points of less than or equal to 175° C., preferably of less than 160° C. and in a preferred way of less than 150° C., and of greater than 15% by weight and more preferably still of between 20% and 95% by weight. When the process is carried out in two hydrocracking steps, the conversion per pass in the second step is kept moderate in order to maximize the selectivity for compounds of the naphtha cut (with a boiling point of less than or equal to 175° C., in particular between 80 and less than or equal to 175° C.). The conversion per pass is limited by the use of a high recycle rate over the loop of the second hydrocracking step. This rate is defined as the ratio of the feed flow rate of step c") to the flow rate of the feedstock of step a); preferentially, this ratio is of between 0.2 and 4, preferably between 0.5 and 2.5.

The hydrocracking step(s) thus does (do) not necessarily make it possible to convert all the compounds with a boiling point greater than 175° C. (diesel cut) into compounds with a boiling point of less than or equal to 175° C. (naphtha cut). After fractionation step e), there may therefore remain a more or less significant proportion of compounds with a boiling point greater than 175° C. In order to increase the conversion, at least a part of this unconverted cut can be recycled as described below to step c') or else can be sent to a second hydrocracking step c"). Another part can be bled off. Depending on the operating conditions of the process, said bleed can be of between 0% and 10% by weight of the cut comprising compounds with a boiling point of greater than 175° C., with respect to the incoming feedstock, and preferably between 0.5% and 5% by weight.

In accordance with the invention, the hydrocracking step(s) proceed(s) in the presence of at least one hydrocracking catalyst.

The hydrocracking catalyst(s) used in the hydrocracking step(s) are conventional hydrocracking catalysts known to those skilled in the art, of bifunctional type combining an acid function with a hydro-dehydrogenating function and optionally at least one binding matrix. The acid function is contributed by supports of high surface area (generally 150 to 800 $m^2/g$) exhibiting a surface acidity, such as halogenated (in particular chlorinated or fluorinated) aluminas, combinations of aluminum and boron oxides, amorphous silica-aluminas and zeolites. The hydro-dehydrogenating function is contributed by at least one metal from group VIB of the Periodic Table and/or at least one metal from group VIII.

Preferably, the hydrocracking catalyst(s) comprise a hydro-dehydrogenating function comprising at least one metal from group VIII chosen from iron, cobalt, nickel, ruthenium, rhodium, palladium and platinum, and preferably from cobalt and nickel. Preferably, said catalyst(s) also comprise at least one metal from group VIB chosen from chromium, molybdenum and tungsten, alone or as a mixture, and preferably from molybdenum and tungsten. Hydro-dehydrogenating functions of NiMo, NiMoW or NiW type are preferred.

Preferably, the content of metal from group VIII in the hydrocracking catalyst(s) is advantageously of between 0.5% and 15% by weight and preferably between 1% and 10% by weight, the percentages being expressed as percentage by weight of oxides, relative to the total weight of the catalyst. When the metal is cobalt or nickel, the metal content is expressed as CoO and NiO respectively.

Preferably, the content of metal from group VIB in the hydrocracking catalyst(s) is advantageously of between 5% and 35% by weight and preferably between 10% and 30% by weight, the percentages being expressed as percentage by weight of oxides, relative to the total weight of the catalyst. When the metal is molybdenum or tungsten, the metal content is expressed as $MoO_3$ and $WO_3$ respectively.

The hydrocracking catalyst(s) can also optionally comprise at least one promoter element deposited on the catalyst and chosen from the group formed by phosphorus, boron and silicon, optionally at least one element from group VIIa (chlorine, fluorine preferred), optionally at least one element from group VIIB (manganese preferred) and optionally at least one element from group VB (niobium preferred).

Preferably, the hydrocracking catalyst(s) comprise at least one amorphous or poorly crystalline porous inorganic matrix of oxide type chosen from aluminas, silicas, silica-aluminas, aluminates, alumina-boron oxide, magnesia, silica-magnesia, zirconia, titanium oxide or clay, alone or as a mixture, and preferably aluminas or silica-aluminas, alone or as a mixture.

Preferably, the silica-alumina contains more than 50% by weight of alumina, preferably more than 60% by weight of alumina.

Preferably, the hydrocracking catalyst(s) also optionally comprise a zeolite chosen from Y zeolites, preferably from USY zeolites, alone or in combination with other zeolites from beta, ZSM-12, IZM-2, ZSM-22, ZSM-23, SAPO-11, ZSM-48 or ZBM-30 zeolites, alone or as a mixture. Preferably, the zeolite is USY zeolite alone.

In the case where said catalyst comprises a zeolite, the content of zeolite in the hydrocracking catalyst(s) is advantageously of between 0.1% and 80% by weight, preferably of between 3% and 70% by weight, the percentages being expressed as percentage of zeolite relative to the total weight of the catalyst.

A preferred catalyst comprises, and preferably consists of, at least one metal from group VIB and optionally at least one non-noble metal from group VIII, at least one promoter element, and preferably phosphorus, at least one Y zeolite and at least one alumina binder.

An even more preferred catalyst comprises, and preferably consists of, nickel, molybdenum, phosphorus, a USY zeolite, and optionally also a beta zeolite, and alumina.

Another preferred catalyst comprises, and preferably consists of, nickel, tungsten, alumina and silica-alumina.

Another preferred catalyst comprises, and preferably consists of, nickel, tungsten, a USY zeolite, alumina and silica-alumina.

Said hydrocracking catalyst is, for example, in the form of extrudates.

In one variant, the hydrocracking catalyst used in step c") comprises a hydro-dehydrogenating function comprising at least one noble metal from group VIII chosen from palladium and platinum, alone or as a mixture. The content of noble metal from group VIII is advantageously of between 0.01% and 5% by weight and preferably between 0.05% and 3% by weight, the percentages being expressed as percentage by weight of oxides (PtO or PdO), relative to the total weight of the catalyst.

According to another aspect of the invention, the hydrocracking catalyst as described above also comprises one or more organic compounds containing oxygen and/or nitrogen and/or sulfur. Such a catalyst is often denoted by the term "additivated catalyst". Generally, the organic compound is chosen from a compound comprising one or more chemical functions chosen from a carboxylic, alcohol, thiol, thioether, sulfone, sulfoxide, ether, aldehyde, ketone, ester, carbonate, amine, nitrile, imide, oxime, urea and amide function or also compounds including a furan ring or also sugars.

The preparation of the catalysts for steps a), b), c), c') or c") is known and generally comprises a step of impregnation of the group VIII metals and of the group VIB metals when present, and optionally of the phosphorus and/or boron on the support, followed by drying, and then optionally calcining. In the case of additivated catalyst, the preparation generally takes place by simple drying without calcination after introduction of the organic compound. The term "calcination" is understood here to mean a heat treatment under a gas containing air or oxygen at a temperature of greater than or equal to 200° C. Before their use in a step of the process, the catalysts are generally subjected to a sulfidation in order to form the active entity. The catalyst of step a) can also be a catalyst used in its reduced form, thus involving a reduction step in its preparation.

The gas stream comprising hydrogen, which feeds the reaction section of a), b), c), c') or c") may consist of a supply of hydrogen and/or of recycled hydrogen advantageously obtained from step d) and/or from the optional step e). Preferably, an additional gas stream comprising hydrogen is advantageously introduced at the inlet of each reactor, in particular operating in series, and/or at the inlet of each catalytic bed starting from the second catalytic bed of the reaction section. These additional gas streams are also referred to as cooling streams. They make it possible to control the temperature in the reactor in which the reactions carried out are generally highly exothermic.

Optionally, each of steps a), b), c), c') or c") can use a heating section located upstream of the reaction section and in which the ingoing effluent is heated so as to reach a suitable temperature. Said optional heating section can thus comprise one or more exchangers preferably allowing heat exchange between the hydrotreated effluent and the hydrocracked effluent, and/or a preheating oven.

Separation Step d)

According to the invention, the treatment process comprises a separation step d), advantageously performed in at least one washing/separation section, fed at least with the hydrotreated effluent obtained from step c), or the hydrocracked effluent obtained from optional steps c') and c"), and an aqueous solution, to obtain at least one gaseous effluent, an aqueous effluent and a hydrocarbon effluent.

The gaseous effluent obtained on conclusion of step d) advantageously comprises hydrogen, preferably comprises at least 80 vol %, preferably at least 85 vol %, of hydrogen. Advantageously, said gaseous effluent may be at least partly recycled to selective hydrogenation step a) and/or hydroconversion step b) and/or hydrotreatment step c) and/or hydrocracking step c') and/or hydrocracking step c"), the recycling system possibly comprising a purification section.

The aqueous effluent obtained on conclusion of step d) advantageously comprises ammonium salts and/or hydrochloric acid.

This separation step d) makes it possible in particular to remove the ammonium chloride salts, which are formed by reaction between the chloride ions, released by the hydrogenation of the chlorinated compounds in HCl form, in particular during steps a), b) and c), followed by dissolution in the water, and the ammonium ions, generated by the hydrogenation of the nitrogenous compounds in $NH_3$ form, notably during step c), and/or introduced by injection of an amine, followed by dissolution in the water, and thus to limit the risks of plugging, in particular in the transfer lines and/or in the sections of the process of the invention and/or the lines for transfer to the steam cracker, due to the precipitation of the ammonium chloride salts. It also makes it possible to remove the hydrochloric acid formed by the reaction of the hydrogen ions and the chloride ions.

Depending on the content of chlorinated compounds in the initial feedstock to be treated, a flux containing an amine such as example monoethanolamine, diethanolamine and/or monodiethanolamine can be injected upstream of selective hydrogenation step a) and/or between hydroconversion step b) and hydrotreatment step c) and/or between hydrocracking step c') and separation step d), preferably upstream of selective hydrogenation step a), when it is present, in order to ensure a sufficient amount of ammonium ions to combine the chloride ions formed during the hydrotreatment step, thus making it possible to limit the formation of hydrochloric acid and thus to limit corrosion downstream of the separation section.

Advantageously, separation step d) comprises injection of an aqueous solution, preferably injection of water, into the hydrotreated effluent obtained from step c), or the hydrocracked effluent obtained from the optional steps c') and c"), upstream of the washing/separation section, so as to at least partly dissolve the ammonium chloride salts and/or the hydrochloric acid and thus to improve the removal of the chlorinated impurities and to reduce the risks of clogging caused by accumulation of the ammonium chloride salts.

Separation step d) is advantageously performed at a temperature of between 50 and 450° C., preferentially between 100 and 440° C., preferably between 200 and 420° C. It is important to perform said step in this temperature range (and therefore not to cool the hydroconverted effluent too much) at the risk of clogging in the lines due to the precipitation of the ammonium chloride salts. Advantageously, separation step d) is carried out at a pressure close to that used in steps a) and/or c), preferably between 1.0 and 20.0 MPa, so as to facilitate the recycling of hydrogen.

The washing/separation section of step d) can at least partly be carried out in common or separate items of washing and separation equipment, these items of equipment being well known (separating drums which can be operated at various pressures and temperatures, pumps, heat exchangers, washing columns, and the like).

In one optional embodiment of the invention, separation step d) comprises the injection of an aqueous solution into the hydrotreated effluent obtained from step c), followed by the washing/separation section advantageously comprising a separation phase for obtaining at least one aqueous effluent charged with ammonium salts, a washed liquid hydrocarbon effluent and a partially washed gaseous effluent. The aqueous effluent charged with ammonium salts and the washed liquid hydrocarbon effluent can subsequently be separated in a knockout drum in order to obtain said hydrocarbon effluent and said aqueous effluent. Said partially washed gaseous effluent can, in parallel, be introduced into a washing column where it circulates countercurrentwise to an aqueous stream, preferably of the same nature as the aqueous solution injected into the hydrotreated effluent, which makes it possible to remove, at least partly and preferably completely, the hydrochloric acid contained in the partially washed gaseous effluent and thus to obtain said gaseous effluent, preferably essentially comprising hydrogen, and an acidic aqueous stream. Said aqueous effluent resulting from the knockout drum can optionally be mixed with said acidic aqueous stream, and be used, optionally as a mixture with said acidic aqueous stream, in a water recycling circuit for feeding separation step d) with said aqueous solution upstream of the washing/separation section and/or with said aqueous stream in the washing column. Said water recycling circuit can comprise a supply of water and/or of a basic solution and/or a bleed making it possible to discharge the dissolved salts.

In another optional embodiment of the invention, separation step d) can advantageously comprise a "high pressure" washing/separation section which operates at a pressure close to the pressure of hydrotreatment step c) and/or optional hydrocracking step c'), preferably between 1.0 and 20.0 MPa, in order to facilitate the recycling of hydrogen. This optional "high-pressure" section of step d) may be completed with a "low-pressure" section, so as to obtain a hydrocarbon liquid fraction free of a portion of the gases dissolved at high pressure and intended to be treated directly in a steam cracking process or optionally to be sent to fractionation step e).

The gas fraction(s) obtained from separation step d) may undergo additional purification(s) and separation(s) for the purpose of recovering at least one hydrogen-rich gas which may be recycled upstream of steps a) and/or b) and/or c) and/or c') and/or c") and/or light hydrocarbons, notably ethane, propane and butane, which may advantageously be sent separately or as a mixture into one or more furnaces of steam cracking step f) so as to increase the overall yield of olefins.

The hydrocarbon effluent resulting from separation step d) is sent, partly or completely, either directly to the inlet of a steam cracking unit or to an optional fractionation step e). Preferably, the liquid hydrocarbon effluent is sent, partly or completely, preferably completely, to a fractionation step e).

Fractionation Step e)

The process according to the invention may comprise a step of fractionating all or a part, preferably all, of the hydrocarbon effluent obtained from step d), to obtain at least one gas stream and at least two liquid hydrocarbon streams, said two liquid hydrocarbon streams being at least one naphtha cut comprising compounds with a boiling point of less than or equal to 175° C., in particular between 80 and 175° C., and one hydrocarbon cut comprising compounds with a boiling point of greater than 175° C.

Step e) makes it possible in particular to remove the gases dissolved in the liquid hydrocarbon effluent, such as, for example, ammonia, hydrogen sulfide and light hydrocarbons having from 1 to 4 carbon atoms.

The optional fractionation step e) is advantageously carried out at a pressure of less than or equal to 1.0 MPa abs., preferably between 0.1 and 1.0 MPa abs.

According to one embodiment, step e) can be carried out in a section advantageously comprising at least one stripping column equipped with a reflux circuit comprising a reflux drum. Said stripping column is fed with the liquid hydrocarbon effluent resulting from step d) and with a stream of steam. The liquid hydrocarbon effluent resulting from step d) can optionally be heated before entering the stripping column. Thus, the lightest compounds are entrained in the column top and into the reflux circuit comprising a reflux drum wherein a gas/liquid separation is carried out. The gas phase which comprises the light hydrocarbons is withdrawn from the reflux drum as a gas stream. The naphtha cut comprising compounds with a boiling point of less than or equal to 175° C. is advantageously withdrawn from the reflux drum. The hydrocarbon cut comprising compounds with a boiling point of greater than 175° C. is advantageously withdrawn at the bottom of the stripping column.

According to other embodiments, fractionation step e) can employ a stripping column followed by a distillation column or only a distillation column.

The naphtha cut comprising compounds with a boiling point of less than or equal to 175° C. and the cut comprising compounds with a boiling point of greater than 175° C., which are optionally mixed, may be sent, totally or partly, to a steam cracking unit, at the outlet of which olefins may be (re)formed to participate in the formation of polymers. Preferably, only a part of said cuts is sent to a steam cracking unit; at least a fraction of the remaining part is optionally recycled in at least one of the steps of the process and/or sent to a fuel storage unit, for example a unit for storage of naphtha, a unit for storage of diesel or a unit for storage of kerosene, resulting from conventional petroleum-based feedstocks.

According to a preferred embodiment, the naphtha cut comprising compounds with a boiling point of less than or equal to 175° C. is sent, totally or partly, to a steam cracking unit, whereas the cut comprising compounds with a boiling point of greater than 175° C. is recycled to step a) and/or b) and/or c) and/or c') and/or sent to a fuel storage unit.

In a particular embodiment, the optional fractionation step e) may make it possible to obtain, besides a gas stream, a naphtha cut comprising compounds with a boiling point of less than or equal to 175° C., preferably between 80 and 175° C., and a diesel cut comprising compounds with a boiling point of greater than 175° C. and less than 385° C., and a hydrocarbon cut comprising compounds with a boiling point of greater than or equal to 385° C., known as the heavy hydrocarbon cut. The naphtha cut may be sent, totally or partly, to a steam cracking unit and/or to the storage unit for naphtha obtained from conventional petroleum-based feedstocks; it may also be recycled; the diesel cut may also be sent, totally or partly, either to a steam cracking unit, or to a storage unit for diesel obtained from conventional petroleum-based feedstocks, or may be recycled; the heavy cut may, for its part, be sent, at least partly, to a steam cracking unit, or may be recycled, notably to hydroconversion step b).

In another specific embodiment, the naphtha cut comprising compounds with a boiling point of less than or equal to 175° C. resulting from step e) is fractionated to give a heavy naphtha cut comprising compounds with a boiling point between 80 and 175° C. and a light naphtha cut comprising compounds with a boiling point of less than 80° C., at least a part of said heavy naphtha cut being sent to an aromatic complex comprising at least one step of reforming of the naphtha for the purpose of producing aromatic compounds. According to this embodiment, at least a part of the light naphtha cut is sent to steam cracking step f) described below.

The gas fraction(s) resulting from fractionation step e) can form the subject of additional purification(s) and separation(s) for the purpose of recovering at least light hydrocarbons, in particular ethane, propane and butane, which can advantageously be sent, separately or as a mixture, to one or more furnaces of steam cracking step f) so as to increase the overall yield of olefins.

Recycling of the Cut Comprising Compounds with a Boiling Point of Greater than 175° C.

At least one fraction of the cut comprising compounds with a boiling point of greater than 175° C. obtained from fractionation step e) can be recovered to constitute a recycle stream which is sent upstream of or directly to at least one of the reaction steps of the process according to the invention, in particular to selective hydrogenation step a) and/or hydroconversion step b) and/or hydrotreatment step c) and/or hydrocracking step c') and/or hydrocracking step c"). Optionally, a fraction of the recycle stream can be sent to the optional step a0).

The recycle stream may feed said reaction steps a) and/or b) and/or c) and/or c') and/or c") in a single injection or may be divided into several fractions to feed the reaction steps in several injections, i.e. into different catalytic beds.

Advantageously, the amount of the recycle stream of the cut comprising compounds with a boiling point of greater than 175° C. is adjusted so that the weight ratio between the recycle stream and the feedstock comprising a pyrolysis oil, i.e. the feedstock to be treated feeding the overall process, is less than or equal to 10, preferably less than or equal to 5, and preferentially greater than or equal to 0.001, preferably greater than or equal to 0.01, and preferably greater than or equal to 0.1. Very preferably, the amount of the recycle stream is adjusted so that the weight ratio between the recycle stream and the feedstock comprising a pyrolysis oil is between 0.2 and 5.

According to one preferred variant, at least a fraction of the cut comprising compounds with a boiling point of greater than 175° C. obtained from fractionation step e) is sent to hydroconversion step b).

According to another preferred variant, at least a fraction of the cut comprising compounds with a boiling point of greater than 175° C. obtained from fractionation step e) is sent to hydrocracking step c') when it is present.

According to another preferred variant, at least a fraction of the cut comprising compounds with a boiling point of greater than 175° C. obtained from fractionation step e) is sent to a second hydrocracking step c") when it is present.

The recycling of a part of the cut comprising compounds with a boiling point of greater than 175° C. into or upstream of at least one of the reaction steps of the process according to the invention, and notably into hydroconversion step b) and/or into hydrocracking steps c') and/or c"), advantageously makes it possible to increase the yield of naphtha cut with a boiling point of less than 175° C. The recycling also makes it possible to dilute the impurities and moreover to control the temperature in the reaction step(s) wherein the reactions involved may be highly exothermic.

A purge may be installed on the recycling of the cut comprising compounds with a boiling point of greater than 175° C. Depending on the operating conditions of the process, said purge may be between 0 and 10% by weight of the cut comprising compounds with a boiling point of greater than 175° C. relative to the entering feedstock, and preferably between 0.5% and 5% by weight.

Recycling of the Hydrocarbon Effluent Obtained from Step d) and/or of the Naphtha Cut with a Boiling Point of Less than or Equal to 175° C. Obtained from Step e)

A fraction of the hydrocarbon effluent obtained from separation step d) or a fraction of the cut with a boiling point of less than or equal to 175° C. obtained from the optional fractionation step e) may be recovered to constitute a recycle stream which is sent upstream of or directly to at least one of the reaction steps of the process according to the invention, in particular to selective hydrogenation step a) and/or hydrotreatment step c). Optionally, a fraction of the recycle stream may be sent to the optional pretreatment step a0).

Preferably, at least a fraction of the hydrocarbon effluent obtained from separation step d) or of the naphtha cut with a boiling point of less than or equal to 175° C. obtained from the optional fractionation step e) feeds hydrotreatment step c).

Advantageously, the amount of the recycle stream, that is to say the recycled fraction of product obtained, is adjusted so that the ratio by weight of the recycle stream to the feedstock comprising a pyrolysis oil, that is to say the feedstock to be treated feeding the overall process, is less than or equal to 10, preferably less than or equal to 5, and preferentially greater than or equal to 0.001, preferably greater than or equal to 0.01 and in a preferred way greater than or equal to 0.1. Very preferably, the amount of the recycle stream is adjusted so that the weight ratio between the recycle stream and the feedstock comprising a pyrolysis oil is between 0.2 and 5.

Advantageously, for the starting phases of the process, a hydrocarbon cut external to the process can be used as recycle stream. Those skilled in the art will then know how to choose said hydrocarbon cut.

The recycling of a part of the product obtained to or upstream of at least one of the reaction steps of the process according to the invention advantageously makes it possible, on the one hand, to dilute the impurities and, on the other hand, to control the temperature in the reaction step(s), wherein the reactions involved can be highly exothermic.

Said hydrocarbon effluent or said hydrocarbon stream(s) thus obtained by treatment according to the process of the invention of a plastics pyrolysis oil exhibit(s) a composition compatible with the specifications of a feedstock at the inlet of a steam cracking unit. In particular, the composition of the hydrocarbon effluent or of said hydrocarbon stream(s) is preferably such that:

the total content of metallic elements is less than or equal to 5.0 ppm by weight, preferably less than or equal to 2.0 ppm by weight, preferentially less than or equal to 1.0 ppm by weight and in a preferred way less than or equal to 0.5 ppm by weight, with:

a content of silicon (Si) element of less than or equal to 1.0 ppm by weight, preferably of less than or equal to 0.6 ppm by weight, and a content of iron (Fe) element of less than or equal to 100 ppb by weight, the sulfur content is less than or equal to 500 ppm by weight, preferably less than or equal to 200 ppm by weight, the nitrogen content is less than or equal to 100 ppm by weight, preferably less than or equal to 50 ppm by weight and preferably less than or equal to 5 ppm by weight, the content of asphaltenes is less than or equal to 5.0 ppm by weight, the total content of chlorine element is less than or equal to 10 ppm by weight, preferably less than 1.0 ppm by weight, the content of olefinic compounds (monoolefins and diolefins) is less than or equal to 5.0% by weight, preferably less than or equal to 2.0% by weight, in a preferred way less than or equal to 0.1% by weight.

The contents are given as relative concentrations by weight, percentages (%) by weight, part(s) per million (ppm) by weight or part(s) per billion (ppb) by weight, relative to the total weight of the stream under consideration.

The process according to the invention thus makes it possible to treat plastics pyrolysis oils in order to obtain an effluent which can be injected, completely or partly, into a steam cracking unit.

Steam Cracking Step f) (Optional)

The hydrocarbon effluent resulting from separation step d), or at least one of the two liquid hydrocarbon streams resulting from the optional step e), can be sent, completely or partly, to a steam cracking step f).

Advantageously, the gas fraction(s) resulting from separation step d) and/or fractionation step e) and containing ethane, propane and butane can also be sent, completely or partly, to steam cracking step f).

Said steam cracking step f) is advantageously carried out in at least one pyrolysis furnace at a temperature of between 700 and 900° C., preferably between 750 and 850° C., and at a pressure of between 0.05 and 0.3 MPa relative. The residence time of the hydrocarbon compounds is generally less than or equal to 1.0 second (noted as s), preferably between 0.1 and 0.5 s. Steam is advantageously introduced upstream of the optional steam cracking step e) and after the separation (or fractionation). The amount of water introduced, advantageously in the form of steam, is advantageously between 0.3 and 3.0 kg of water per kg of hydrocarbon compounds at the inlet of step e). The optional step f) is preferably performed in a plurality of pyrolysis furnaces in parallel, so as to adapt the operating conditions to the various streams feeding step f) and notably obtained from step e), and also to manage the tube decoking times. A furnace comprises one or more tubes arranged in parallel. A furnace can also denote a group of furnaces operating in parallel. For example, a furnace may be dedicated to the cracking of the naphtha cut comprising compounds with a boiling point of less than or equal to 175° C.

The effluents from the various steam cracking furnaces are generally recombined before separation for the purpose of constituting an effluent. It is understood that steam cracking step f) includes the steam cracking furnaces but also the substeps associated with the steam cracking that are well known to those skilled in the art. These substeps may notably include heat exchangers, columns and catalytic reactors and recycling into the furnaces. A column generally makes it possible to fractionate the effluent for the purpose of recovering at least one light fraction comprising hydrogen and compounds having from 2 to 5 carbon atoms, and a fraction comprising pyrolysis petrol, and optionally a fraction comprising pyrolysis oil. Columns make it possible to separate the various constituents of the fractionation light fraction in order to recover at least a cut rich in ethylene ($C_2$ cut) and a cut rich in propylene ($C_3$ cut) and optionally a cut rich in butenes ($C_4$ cut). The catalytic reactors make it possible in particular to carry out hydrogenations of the $C_2$, $C_3$, indeed even $C_4$, cuts and of the pyrolysis petrol. The saturated compounds, in particular the saturated compounds having from 2 to 4 carbon atoms, are advantageously recycled to the steam cracking furnaces so as to increase the overall yields of olefins.

This steam cracking step f) makes it possible to obtain at least one effluent containing olefins comprising 2, 3 and/or 4 carbon atoms (i.e. C2, C3 and/or C4 olefins), in satisfactory contents, in particular greater than or equal to 30% by weight, notably greater than or equal to 40% by weight, or even greater than or equal to 50% by weight of total olefins comprising 2, 3 and 4 carbon atoms relative to the weight of the steam cracking effluent under consideration. Said $C_2$, $C_3$ and $C_4$ olefins can subsequently be advantageously used as polyolefin monomers.

According to a preferred embodiment of the invention, the process for treating a feedstock comprising a pyrolysis oil comprises, and preferably consists of, the sequence of steps as follows, and preferably in the order given:

b) of hydroconversion, c) of hydrotreatment, d) of separation or b) of hydroconversion, c) of hydrotreatment, d) of separation, e) of fractionation or b) of hydroconversion, c) of hydrotreatment, d) of separation, e) of fractionation and recycling of the cut comprising compounds with a boiling point above 175° C. to hydroconversion step b) and/or recycling of the cut comprising compounds with a boiling point less than or equal to 175° C. to hydrotreatment step c)

to produce an effluent, at least part of which is suitable for treatment in a steam cracking unit.

According to another preferred embodiment of the invention, the process for treating a feedstock comprising a pyrolysis oil comprises, and preferably consists of, the sequence of steps as follows, and preferably in the order given:

b) of hydroconversion, c) of hydrotreatment, c') of hydrocracking, d) of separation or b) of hydroconversion, c) of hydrotreatment, c') of hydrocracking, d) of separation, e) of fractionation or b) of hydroconversion, c) of hydrotreatment, c') of hydrocracking, d) of separation, e) of fractionation and recycling of the cut comprising compounds with a boiling point above 175° C. to hydroconversion step b) and/or to hydrocracking step c') and/or recycling of the cut comprising compounds with a boiling point less than or equal to 175° C. to hydrotreatment step c)

to produce an effluent, at least part of which is suitable for treatment in a steam cracking unit.

All the embodiments can comprise and preferably consist of, in addition, a pretreatment step a0).

All the embodiments can comprise, and preferably consist of, in addition, a selective hydrogenation step a).

All the embodiments can comprise, and preferably consist of, in addition, a steam cracking step f).

Analysis Methods Used

The analysis methods and/or standards used to determine the characteristics of the various streams, in particular of the feedstock to be treated and of the effluents, are known to those skilled in the art. They are in particular listed below by way of information. Other methods reputed to be equivalent can also be used, in particular equivalent IP, EN or ISO methods:

TABLE 1

| Description | Methods |
|---|---|
| Density @15° C. | ASTM D4052 |
| Sulfur Content | ISO 20846 |
| Nitrogen Content | ASTM D4629 |
| Acid number | ASTM D664 |

TABLE 1-continued

| Description | Methods |
|---|---|
| Bromine Number | ASTM D1159 |
| Content of Diolefins from the maleic anhydride value | MAV method (1) |
| Content of Oxygen-containing molecules | Combustion + Infrared |
| Content of Paraffins | UOP990-11 |
| Content of Naphthenes and Olefins | UOP990-11 |
| Content of Aromatics | UOP990-11 |
| Content of Halogens | ASTM D7359 |
| Chloride Content | ASTM D7536 |
| Content of Metals: | ASTM D5185 |
| P | |
| Fe | |
| Si | |
| Na | |
| B | |
| Simulated distillation | ASTM D2887 |

(1) MAV method described in the paper: C. López-García et al., Near Infrared Monitoring of Low Conjugated Diolefins Content in Hydrotreated FCC Gasoline Streams, Oil & Gas Science and Technology - Rev. IFP, Vol. 62 (2007), No. 1, pp. 57-68

BRIEF DESCRIPTION OF THE DRAWINGS

The information regarding the elements referenced in FIG. 1 enables a better understanding of the invention, without said invention being limited to the particular embodiments illustrated in FIG. 1. The various embodiments presented may be used alone or in combination with each other, without any limit to the combinations.

FIG. 1 represents the diagram of a specific embodiment of the process of the present invention, comprising:
- an optional step a) of selective hydrogenation of a hydrocarbon feedstock obtained from pyrolysis 1, in the presence of a hydrogen-rich gas 2 and optionally of an amine supplied by the stream 3, performed in at least one fixed-bed reactor including at least one selective hydrogenation catalyst, to obtain an effluent 4;
- a step b) of hydroconversion of the effluent 4 obtained from step a), in the presence of hydrogen 5, performed in at least one ebullated-bed, entrained-bed and/or moving-bed reactor including at least one hydroconversion catalyst, to obtain a hydroconverted effluent 6;
- a step c) of hydrotreatment of at least a part of the effluent from step b), in the presence of hydrogen 7 carried out in at least one fixed-bed reactor comprising at least one hydrotreatment catalyst, to obtain a hydrotreated effluent 8; said hydrotreatment step c) being carried out after hydroconversion step b) without any step of intermediate separation of a gas stream between hydroconversion step b) and hydrotreatment step c),
- optionally a step c') of hydrocracking of at least a part of the effluent obtained from step c), in the presence of hydrogen 9, performed in at least one fixed-bed reactor comprising at least one hydrocracking catalyst, to obtain a hydrocracked effluent 10;
- a step d) of separation of the effluent 10 performed in the presence of an aqueous washing solution 11, making it possible to obtain at least one fraction 12 comprising hydrogen, an aqueous fraction 13 containing dissolved salts, and a hydrocarbon liquid fraction 14;
- optionally a step e) of fractionation of the hydrocarbon liquid fraction 14, making it possible to obtain at least one gas fraction 15, a hydrocarbon cut 16 comprising compounds with a boiling point of less than or equal to 175° C. and a hydrocarbon cut 17 comprising compounds with a boiling point of greater than 175° C.

At the end of step d) or e), at least a part of the hydrotreated hydrocarbon liquid effluent 16 is sent to a steam cracking process (not represented).

Optionally, a part of said hydrocarbon cut 16 comprising compounds with a boiling point of less than or equal to 175° C. constitutes a recycle stream 16a and/or 16b which feeds steps a) and/or b) respectively.

Optionally, a part of said hydrocarbon cut 17 comprising compounds with a boiling point of greater than 175° C. constitutes a recycle stream 17a and/or 17b which feeds steps b) and/or c') respectively.

Only the main steps, with the main streams, are shown in FIG. 1, so as to allow a better understanding of the invention. It is clearly understood that all the items of equipment required for the operation are present (drums, pumps, exchangers, ovens/furnaces, columns, and the like), even if not represented. It is also understood that gas streams rich in hydrogen (supply or recycle), as described above, can be injected at the inlet of each reactor or catalytic bed or between two reactors or two catalytic beds. Means well known to those skilled in the art for the purification and recycling of hydrogen can also be employed.

EXAMPLE

The feedstock 1 treated in the process is a plastics pyrolysis oil having the characteristics indicated in table 2.

TABLE 2

Characteristics of the feedstock

| Description | Methods | Unit | Pyrolysis oil |
|---|---|---|---|
| Density @15° C. | ASTM D4052 | g/cm$^3$ | 0.82 |
| Sulfur Content | ISO 20846 | ppm by weight | 2500 |
| Nitrogen Content | ASTM D4629 | ppm by weight | 730 |
| Acid number | ASTM D664 | mg KOH/g | 1.5 |
| Bromine Number | ASTM D1159 | g/100 g | 80 |
| Content of Diolefins from the maleic anhydride value | MAV method | % by weight | 10.0 |
| Content of Oxygen-containing molecules | Combustion + Infrared | % by weight | 1.0 |
| Content of Paraffins | UOP990-11 | % by weight | 45 |
| Content of naphthenes and olefins | UOP990-11 | % by weight | 45 |
| Content of Aromatics | UOP990-11 | % by weight | 10 |
| Content of Halogens | ASTM D7359 | ppm by weight | 350 |
| Chloride Content | ASTM D7536 | ppm by weight | 320 |
| Content of Metals: | ASTM D5185 | | |
| P | | ppm by weight | 10 |
| Fe | | ppm by weight | 25 |
| Si | | ppm by weight | 45 |
| Na | | ppm by weight | 2 |
| B | | ppm by weight | 2 |
| Simulated distillation | ASTM D2887 | | |
| 0% | | ° C. | 40 |
| 10% | | ° C. | 98 |
| 30% | | ° C. | 161 |
| 50% | | ° C. | 232 |
| 70% | | ° C. | 309 |
| 90% | | ° C. | 394 |
| 100% | | ° C. | 432 |

The feedstock 1 is subjected to a selective hydrogenation step a) carried out in a fixed-bed reactor and in the presence of hydrogen 2 and of a selective hydrogenation catalyst of the NiMo-on-Alumina type, under the conditions indicated in table 3.

TABLE 3

Conditions of the selective hydrogenation step a)

| | | |
|---|---|---|
| Temperature | ° C. | 180 |
| Partial hydrogen pressure | MPa abs. | 9.0 |
| H$_2$/HC (Hydrogen coverage by volume, relative to the volume of feedstock) | Sm$^3$/m$^3$ | 50 |
| HSV (flow rate by volume of feedstock/volume of catalysts) | h$^{-1}$ | 0.5 |

On conclusion of selective hydrogenation step a), the diolefin content in the feedstock has been significantly reduced.

The effluent 4 obtained from selective hydrogenation step a) is subjected directly, without separation, to a hydroconversion step b) performed in an ebullated bed and in the presence of hydrogen 5 and of a hydrotreatment catalyst of the NiMo-on-alumina type under the conditions presented in table 4.

TABLE 4 conditions of hydroconversion step b)

| | | |
|---|---|---|
| Hydroconversion temperature | ° C. | 350 |
| Partial hydrogen pressure | MPa abs. | 9.0 |
| H$_2$/HC (Hydrogen coverage by volume, relative to the volume of feedstock) | Sm$^3$/m$^3$ | 300 |
| HSV (volume flow rate of feedstock in step b)/volume of catalysts) | h$^{-1}$ | 1.5 |

The effluent 6 from hydroconversion step b) is then sent to hydrotreatment step c) and in the presence of hydrogen and of a hydrotreatment catalyst of the NiMo-on-alumina type under the conditions presented in table 5.

TABLE 5 conditions of hydrotreatment step c)

| | | |
|---|---|---|
| Hydrotreatment temperature | ° C. | 350 |
| Partial hydrogen pressure | MPa abs. | 9.0 |
| H$_2$/HC (Hydrogen coverage by volume, relative to the volume of feedstock) | Sm$^3$/m$^3$ | 300 |
| HSV (flow rate by volume of feedstock/volume of catalysts) | h$^{-1}$ | 1 |

The effluent 8 from hydrotreatment step c) is subjected to a separation step d) and a fractionation step e) which comprises a stripping column and a distillation column.

Table 6 gives the overall yields, relative to the feedstock 1 at the process chain inlet, of the various fractions obtained at the outlet of fractionation step e).

TABLE 6 yields for the various products and fractions obtained at the outlet of fractionation step e)

| | | |
|---|---|---|
| H$_2$S + NH$_3$ | % by weight | 0.9 |
| C1-C4 | % by weight | 2.1 |
| PI-175° C. Fraction | % by weight | 35.4 |
| 175° C.+ Fraction | % by weight | 63.2 |
| Total | % by weight | 101.6 |

The compounds H$_2$S and NH$_3$ are mainly eliminated in the form of salts in the aqueous phase removed in separation step d).

The characteristics of the PI−175° C. and 175° C.+ liquid fractions obtained after fractionation step e) are shown in table 7:

TABLE 7 characteristics of the PI-175° C. and 175° C.+ fractions after fractionation step e)

| | | PI-175° C. Fraction | 175° C.+ Fraction |
|---|---|---|---|
| Density at 15° C. (ASTM D4052) | g/cm$^3$ | 0.750 | 0.820 |
| Content of: | | | |
| Sulfur (ASTM D5453) | ppm by weight | <2 | <2 |
| Nitrogen (ASTM D4629) | ppm by weight | <5 | <10 |
| Fe (ASTM D5185) | ppb by weight | Not detected | <50 |
| Total metals (ASTM D5185) | ppm by weight | Not detected | <1 |
| Chlorine (ASTM D7536) | ppb by weight | Not detected | <25 |
| Paraffins (UOP990-11) | % by weight | 75 | 70 |
| Naphthenes (UOP990-11) | % by weight | 25 | 28 |
| Olefins (UOP990-11) | % by weight | Not detected | Not detected |
| Aromatics (UOP990-11) | % by weight | <1 | 2 |
| Simulated distillation (ASTM D2887) in % | | | |
| 0 | ° C. | 15 | 153 |
| 5 | ° C. | 38 | 185 |
| 10 | ° C. | 55 | 205 |
| 30 | ° C. | 90 | 240 |
| 50 | ° C. | 118 | 275 |
| 70 | ° C. | 140 | 310 |
| 90 | ° C. | 163 | 360 |
| 95 | ° C. | 181 | 377 |
| 100 | ° C. | 202 | 402 |

The PI−175° C. and 175° C.+ liquid fractions both have compositions that are compatible with a steam cracking unit, since:
- they do not contain olefins (monoolefins and diolefins);
- they have very low contents of chlorine element (respectively, an undetected content and a content of 25 ppb by weight), below the limit required for a steam cracking feedstock;
- the contents of metals, in particular of iron (Fe), are themselves also very low (contents of metals not detected for the PI−175° C. fraction and <1 ppm by weight for the 175° C.+ fraction; contents of Fe not detected for the PI−175° C. fraction and <50 ppb by weight for the 175° C.+ fraction) and below the limits required for a steam cracker feedstock (≤5.0 ppm by weight, very preferably ≤1 ppm by weight for metals; ≤100 ppb by weight for Fe);
- finally, they contain sulfur (<2 ppm by weight for the PI−175° C. fraction and <2 ppm by weight for the 175° C.+ fraction) and nitrogen (<5 ppm by weight for the PI−175° C. fraction and <10 ppm by weight for the 175° C.+ fraction) with contents that are very much lower than the limits required for a steam cracking feedstock (≤500 ppm by weight, preferably ≤200 ppm by weight for S and N).

The PI−175° C. and 175° C.+ liquid fractions obtained are then advantageously sent to a steam cracking step f).

The invention claimed is:

1. A process for treating a feedstock comprising a plastics pyrolysis oil and/or a solid recovery fuel pyrolysis oil, comprising:
  a) a selective hydrogenation step performed in a reaction section fed at least with said feedstock and a gas stream comprising hydrogen, said feedstock maintained in liquid phase, wherein the selective hydrogenation is performed in the presence of at least one selective hydrogenation catalyst, at a temperature of between 10° and 280° C., at a partial pressure of hydrogen of between 1.0 and 20.0 MPa absolute and at an hourly space velocity of between 0.3 and 10.0 h-$^1$, to obtain a hydrogenated effluent;

b) a hydroconversion step performed in a hydroconversion reaction section, using at least one ebullated-bed reactor, entrained-bed reactor and/or moving-bed reactor, comprising at least one hydroconversion catalyst, said hydroconversion reaction section being fed at least with said hydrogenated effluent and a gas stream comprising hydrogen, said hydroconversion reaction section being operated at a temperature of between 25° and 450° C., a partial pressure of hydrogen of between 1.0 and 20.0 MPa absolute and an hourly space velocity of between 0.05 and 10.0 h-$^1$, to obtain a hydroconverted effluent;

c) a hydrotreatment step performed in a hydrotreatment reaction section comprising at least one fixed-bed reactor having n catalytic beds, n being an integer greater than or equal to 1, each bed comprising at least one hydrotreatment catalyst, said hydrotreatment reaction section being supplied with at least a portion of said hydroconverted effluent and a gas stream comprising hydrogen, said hydrotreatment reaction section being operated at a temperature of between 25° and 430° C., a hydrogen partial pressure between 1.0 and 20.0 MPa absolute and an hourly volume velocity between 0.1 and 10.0 h-$^1$, to obtain a hydrotreated effluent, said hydrotreatment step c) being carried out after hydroconversion step b) without an intermediate separation step between hydroconversion step b) and hydrotreatment step c);

c') optionally, a hydrocracking step performed in a hydrocracking reaction section comprising at least one fixed bed reactor containing n catalytic beds, n being an integer greater than or equal to 1, each bed comprising at least one hydrocracking catalyst, said hydrocracking reaction section being fed with said hydrotreated effluent and/or with a cut comprising compounds with a boiling point greater than 175° C. obtained from step e), and with a gas stream comprising hydrogen, said hydrocracking reaction section being operated at an average temperature of between 25° and 450° C., a partial pressure of hydrogen of between 1.5 and 20.0 MPa absolute and an hourly space velocity of between 0.1 and 10.0 h$^1$, to obtain a hydrocracked effluent;

d) a separation step, fed with the hydrotreated effluent or with the hydrocracked effluent and with an aqueous solution, said step being performed at a temperature of between 5° and 450° C., to obtain at least one gaseous effluent, an aqueous effluent and a hydrocarbon effluent, wherein the separation step comprises an injection of the aqueous solution into the hydrotreating effluent or the hydrocracked effluent, upstream of the separation; and e) optionally a step of fractionating all or a part of the hydrocarbon effluent to obtain at least one gaseous effluent, at least one naphtha cut comprising compounds with a boiling point of less than or equal to 175° C. and the hydrocarbon cut comprising compounds with a boiling point of greater than 175° C.

2. The process as claimed in claim 1, comprising fractionation step e).

3. The process as claimed in claim 1, comprising hydrocracking step c').

4. The process as claimed in claim 1, wherein at least one fraction of the hydrocarbon effluent obtained from separation step d) or at least one fraction of the naphtha cut comprising compounds with a boiling point of less than or equal to 175° C. obtained from fractionation step e) is sent to selective hydrogenation step a) and/or hydrotreatment step c).

5. The process as claimed in claim 1, wherein at least one fraction of the naphtha cut comprising compounds with a boiling point of greater than 175° C. resulting from fractionation step e) is sent to hydroconversion step b) and/or hydrocracking step c').

6. The process as claimed in claim 1, comprising a step a0) of pretreatment of the feedstock upstream of hydrogenation step a), the pretreatment comprising a filtration step and/or an electrostatic separation step and/or a step of washing by means of an aqueous solution and/or an adsorption step.

7. The process as claimed in claim 1, wherein the hydrocarbon effluent obtained from separation step d), or at least one of the at least two hydrocarbon cuts obtained from step e), is totally or partly sent to a steam cracking step f) performed in at least one pyrolysis furnace at a temperature of between 70° and 900° C. and at a pressure of between 0.05 and 0.3 MPa relative.

8. The process as claimed in claim 1, wherein separation step e) further comprises fractionation of the naphtha cut into a light naphtha cut comprising compounds with a boiling point below 80° C. and a heavy naphtha cut comprising compounds with a boiling point of between 80 and 175 C.

9. The process as claimed in claim 8, wherein at least part of said heavy naphtha cut is sent to an aromatic complex including at least one naphtha reforming step and/or wherein at least part of said light naphtha cut is sent to steam cracking step f).

10. The process as claimed in claim 1, wherein said selective hydrogenation catalyst comprises a support selected from the group consisting of alumina, silica, silicas-aluminas, magnesia, clays and mixtures thereof and a hydro-dehydrogenating function comprising either at least one element from group VIII and at least one element from group VIB, or at least one element from group VIII.

11. The process as claimed in claim 1, wherein, when step b) is performed in an ebullated bed or in a moving bed, said hydroconversion catalyst of step b) comprises a supported catalyst comprising a group VIII metal selected from the group consisting of Ni, Pd, Pt, Co, Rh, Ru and mixtures thereof, optionally a group VIB metal selected from the group consisting of Mo, W and mixtures thereof, on an amorphous mineral support selected from the group consisting of alumina, silica, silica-aluminas, magnesia, clays and mixtures of at least two of these minerals, and when step b) is performed in an entrained bed, said hydroconversion catalyst of step b) comprises a dispersed catalyst containing at least one element selected from the group consisting of Mo, Fe, Ni, W, Co, V and Ru.

12. The process as claimed in claim 1, wherein said hydrotreatment catalyst comprises a support selected from the group consisting of alumina, silica, silicas-aluminas, magnesia, clays and mixtures thereof and a hydro-dehydrogenating function comprising at least one element from group VIII and/or at least one element from group VIB.

13. The process as claimed in claim 1, which further comprises a second hydrocracking step c") performed in a hydrocracking reaction section comprising at least one fixed bed reactor containing n catalytic beds, n being an integer greater than or equal to 1, each comprising at least one hydrocracking catalyst, said hydrocracking reaction section being fed with the cut comprising compounds with a boiling point greater than 175° C. obtained from step e) and a gas stream comprising hydrogen, said hydrocracking reaction being performed at a temperature of between 25° and 450° C., a partial pressure of hydrogen of between 1.5 and 20.0 MPa absolute and an hourly space velocity of between 0.1 and 10.0 h', wherein a hydrocracked effluent is obtained and sent to separation step d).

14. The process as claimed in claim 1, wherein said hydrocracking catalyst comprises a support selected from the group consisting of halogenated aluminas, combinations of boron and aluminum oxides, amorphous silica-aluminas and zeolites, and a hydro-dehydrogenating function comprising at least one metal from group VIB selected from the group consisting of chromium, molybdenum, and tungsten, and/or at least one metal from group VIII selected from the group consisting of iron, cobalt, nickel, ruthenium, rhodium, palladium and platinum.

15. The process as claimed in claim 1, wherein the feedstock has the following properties:
 a content of aromatic compounds of between 0 and 90% by weight,
 a content of halogenated compounds of between 2 and 5000 ppm by weight,
 a content of metallic elements of between 10 and 10 000 ppm by weight,
 a content of iron element of between 0 and 100 ppm by weight, and
 a content of silicon element of between 0 and 1000 ppm by weight.

* * * * *